US012175506B2

(12) United States Patent
Khoo et al.

(10) Patent No.: US 12,175,506 B2
(45) Date of Patent: *Dec. 24, 2024

(54) SYSTEMS AND METHODS FOR CHARGING OF ELECTRIC VEHICLES WITH CHARGE BALANCING BETWEEN MULTIPLE ELECTRIC VEHICLE CHARGING STATIONS IN A LOCAL AREA NETWORK

(71) Applicant: Zeco Systems Pte Ltd., Singapore (SG)

(72) Inventors: Lin-Zhuang Khoo, Singapore (SG);
Ron Mahabir, Singapore (SG);
Terence Siew, Singapore (SG);
Renaldo Noma, Singapore (SG);
Neeraj Jhanji, Tokyo (JP)

(73) Assignee: Zeco Systems Pte Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,375

(22) Filed: Aug. 25, 2023

(65) Prior Publication Data

US 2023/0401613 A1    Dec. 14, 2023

Related U.S. Application Data

(63) Continuation of application No. 17/129,680, filed on Dec. 21, 2020, now Pat. No. 11,756,087, which is a
(Continued)

(51) Int. Cl.
*G05D 3/12*        (2006.01)
*B60L 53/14*       (2019.01)
(Continued)

(52) U.S. Cl.
CPC .......... *G06Q 30/0283* (2013.01); *B60L 53/14* (2019.02); *B60L 53/305* (2019.02);
(Continued)

(58) Field of Classification Search
CPC ............... G06Q 30/0283; G06Q 10/02; G06Q 10/1093; G06Q 20/102; G06Q 20/24;
(Continued)

(56) References Cited

U.S. PATENT DOCUMENTS 5,202,617 A    4/1993   Nor
5,306,999 A    4/1994   Hoffman
(Continued)

FOREIGN PATENT DOCUMENTS

DE    10 2010 051 703 A1    6/2011
EP    2 371 612 A1    10/2011
(Continued)

OTHER PUBLICATIONS

City of Westminster, "Understanding existing electric vehicle recharging infrastructure, vehicles available on the market and user behavior and profiles," Apr. 2009, 68 pages.

*Primary Examiner* — Md Azad
(74) *Attorney, Agent, or Firm* — Seed IP Law Group LLP

(57) ABSTRACT

A system for controlling a charging of an electric vehicle, wherein a charging at one electric vehicle charging station affect a charging at another electric vehicle charging station is disclosed. The system includes: an electric power grid, a first electric vehicle charging station connected to the electric power grid, and a second electric vehicle charging station connected to the electric power grid, wherein the first electric vehicle charging station facilitates a charge transfer for an electric vehicle at the second electric vehicle charging station using a mobile device. The mobile device relays communication from the electric vehicle charging stations to the cloud server. The charge transfer request received at the cloud server is authorized using identification information and credit account information received from the mobile device. The charge transfer at the first electric vehicle
(Continued)

Related U.S. Application Data continuation of application No. 16/277,925, filed on Feb. 15, 2019, now Pat. No. 10,872,361, which is a continuation of application No. 15/158,373, filed on May 18, 2016, now Pat. No. 10,210,552, which is a continuation of application No. 13/655,397, filed on Oct. 18, 2012, now Pat. No. 9,348,381.

(60) Provisional application No. 61/620,855, filed on Apr. 5, 2012, provisional application No. 61/549,174, filed on Oct. 19, 2011.

(51) Int. Cl.

| | | |
|---|---|---|
| *B60L 53/30* | (2019.01) | |
| *B60L 53/31* | (2019.01) | |
| *B60L 53/63* | (2019.01) | |
| *B60L 53/64* | (2019.01) | |
| *B60L 53/65* | (2019.01) | |
| *B60L 53/66* | (2019.01) | |
| *B60L 53/68* | (2019.01) | |
| *G01C 21/34* | (2006.01) | |
| *G05D 5/00* | (2006.01) | |
| *G05D 9/00* | (2006.01) | |
| *G05D 11/00* | (2006.01) | |
| *G05D 17/00* | (2006.01) | |
| *G06F 1/26* | (2006.01) | |
| *G06Q 10/02* | (2012.01) | |
| *G06Q 10/1093* | (2023.01) | |
| *G06Q 20/10* | (2012.01) | |
| *G06Q 20/24* | (2012.01) | |
| *G06Q 20/40* | (2012.01) | |
| *G06Q 30/0201* | (2023.01) | |
| *G06Q 30/0283* | (2023.01) | |
| *G06Q 50/06* | (2024.01) | |
| *G06Q 50/30* | (2012.01) | |
| *G06Q 50/40* | (2024.01) | |
| *G08G 1/14* | (2006.01) | |
| *H01M 10/44* | (2006.01) | |
| *H02J 3/32* | (2006.01) | |
| *H02J 7/00* | (2006.01) | |
| *H04L 9/40* | (2022.01) | |
| *H04L 25/20* | (2006.01) | |
| *H04L 67/10* | (2022.01) | |
| *H04W 4/02* | (2018.01) | |
| *H04W 4/40* | (2018.01) | |

(52) U.S. Cl.
CPC ............. *B60L 53/31* (2019.02); *B60L 53/63* (2019.02); *B60L 53/64* (2019.02); *B60L 53/65* (2019.02); *B60L 53/66* (2019.02); *B60L 53/665* (2019.02); *B60L 53/68* (2019.02); *G01C 21/3476* (2013.01); *G01C 21/3492* (2013.01); *G06F 1/26* (2013.01); *G06Q 10/02* (2013.01); *G06Q 10/1093* (2013.01); *G06Q 20/102* (2013.01); *G06Q 20/24* (2013.01); *G06Q 20/409* (2013.01); *G06Q 30/0206* (2013.01); *G06Q 50/06* (2013.01); *G06Q 50/40* (2024.01); *G08G 1/144* (2013.01); *H01M 10/44* (2013.01); *H02J 7/0013* (2013.01); *H04L 25/20* (2013.01); *H04L 63/10* (2013.01); *H04L 67/10* (2013.01); *H04W 4/02* (2013.01); *H04W 4/023* (2013.01); *H04W 4/40* (2018.02); *B60L 2240/12* (2013.01); *B60L 2240/545* (2013.01); *B60L 2240/622* (2013.01); *B60L 2240/72* (2013.01); *B60L 2260/52* (2013.01); *B60L 2260/54* (2013.01); *B60L 2260/58* (2013.01); *B60L 2270/32* (2013.01); *H01M 2220/20* (2013.01); *H02J 3/322* (2020.01); *H02J 7/00034* (2020.01); *H02J 2310/48* (2020.01); *Y02D 30/70* (2020.08); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(58) Field of Classification Search
CPC .. G06Q 20/409; G06Q 30/0206; G06Q 50/06; G06Q 50/30; H04W 4/40; H04W 4/02; H04W 4/023; B60L 53/68; B60L 53/14; B60L 53/64; B60L 53/66; B60L 53/305; B60L 53/665; B60L 53/31; B60L 53/63; B60L 53/65; B60L 2240/12; B60L 2240/545; B60L 2240/622; B60L 2240/72; B60L 2260/52; B60L 2260/54; B60L 2260/58; B60L 2270/32; G01C 21/3476; G01C 21/3492; G06F 1/26; G08G 1/144; H01M 10/44; H01M 2220/20; H02J 7/0013; H02J 3/322; H02J 7/00034; H02J 2310/48; H04L 25/20; H04L 63/10; H04L 67/10; Y02D 30/70; Y02E 60/00; Y02T 10/70; Y02T 10/7072; Y02T 90/12; Y02T 90/14; Y02T 90/16; Y02T 90/167; Y04S 10/126; Y04S 30/14
USPC ...................................................... 320/106
See application file for complete search history.

(56) References Cited

U.S. PATENT DOCUMENTS

| | | |
|---|---|---|
| 5,467,006 A | 11/1995 | Sims |
| 6,930,410 B2 | 8/2005 | Ikeda et al. |
| 7,123,879 B2 | 10/2006 | Koketsu et al. |
| 7,402,978 B2 | 7/2008 | Pryor |
| 7,411,371 B2 | 8/2008 | Hobbs |
| 7,444,192 B2 | 10/2008 | Dickinson et al. |
| 7,489,048 B2 | 2/2009 | King et al. |
| 7,590,472 B2 | 9/2009 | Hakim et al. |
| 7,660,652 B2 | 2/2010 | Smith et al. |
| 7,711,460 B2 | 5/2010 | Yakes et al. |
| 7,719,232 B2 | 5/2010 | Kelty et al. |
| 7,747,739 B2 | 6/2010 | Bridges et al. |
| 7,778,737 B2 | 8/2010 | Rossi et al. |
| 7,782,021 B2 | 8/2010 | Kelty et al. |
| 7,792,613 B2 | 9/2010 | Kressner et al. |
| 7,844,370 B2 | 11/2010 | Pollack et al. |
| 7,849,944 B2 | 12/2010 | DeVault |
| 7,859,221 B2 | 12/2010 | Baker et al. |
| 7,894,952 B2 | 2/2011 | Donovan et al. |
| 7,925,433 B2 | 4/2011 | Smith et al. |
| 7,928,598 B2 | 4/2011 | King et al. |
| 7,949,435 B2 | 5/2011 | Pollack et al. |
| 7,956,570 B2 | 6/2011 | Lowenthal et al. |
| 7,984,852 B2 | 7/2011 | Outwater |
| 7,986,126 B1 | 7/2011 | Bucci et al. |
| 7,991,665 B2 | 8/2011 | Hafner et al. |
| 7,996,098 B2 | 8/2011 | Dickinson et al. |
| 8,000,852 B2 | 8/2011 | Oyobe et al. |
| 8,013,570 B2 | 9/2011 | Baxter et al. |
| 8,019,483 B2 | 9/2011 | Keefe |

(56) References Cited

U.S. PATENT DOCUMENTS

| | | |
|---|---|---|
| 8,025,526 B1 | 9/2011 | Tormey et al. |
| 8,054,039 B2 | 11/2011 | Bauerle et al. |
| 8,072,184 B2 | 12/2011 | Bhade et al. |
| 8,099,198 B2 | 1/2012 | Gurin |
| 8,100,206 B2 | 1/2012 | Kressner et al. |
| 8,102,248 B2 | 1/2012 | Yasuda et al. |
| 8,103,389 B2 | 1/2012 | Golden et al. |
| 8,103,391 B2 | 1/2012 | Ferro et al. |
| 8,106,627 B1 | 1/2012 | Rossi |
| 8,111,043 B2 | 2/2012 | Redmann |
| 8,125,182 B2 | 2/2012 | Hashim et al. |
| 8,129,951 B2 | 3/2012 | Turner et al. |
| 8,136,614 B2 | 3/2012 | Andri |
| 8,138,715 B2 | 3/2012 | Lowenthal et al. |
| 8,154,246 B1 | 4/2012 | Heitmann |
| 8,164,301 B2 | 4/2012 | Uchida |
| 8,179,085 B2 | 5/2012 | Artelsmair et al. |
| 8,188,710 B2 | 5/2012 | Ichikawa et al. |
| 9,026,347 B2 | 5/2015 | Gadh et al. |
| 9,180,783 B1 | 11/2015 | Penilla et al. |
| 9,371,007 B1 | 6/2016 | Penilla et al. |
| 10,872,361 B2 | 12/2020 | Khoo et al. |
| 2007/0063866 A1 | 3/2007 | Webb |
| 2007/0126395 A1 | 6/2007 | Suchar |
| 2008/0150286 A1 | 6/2008 | Fein et al. |
| 2008/0281663 A1 | 11/2008 | Hakim et al. |
| 2009/0015195 A1 | 1/2009 | Loth-Krausser |
| 2009/0040029 A1 | 2/2009 | Bridges et al. |
| 2009/0048716 A1 | 2/2009 | Marhoefer |
| 2009/0082957 A1 | 3/2009 | Agassi et al. |
| 2009/0088907 A1 | 4/2009 | Lewis et al. |
| 2009/0101421 A1 | 4/2009 | Oyobe et al. |
| 2009/0177580 A1 | 7/2009 | Lowenthal et al. |
| 2009/0210357 A1 | 8/2009 | Pudar et al. |
| 2009/0259603 A1 | 10/2009 | Housh et al. |
| 2009/0287578 A1 | 11/2009 | Paluszek et al. |
| 2009/0312903 A1 | 12/2009 | Hafner et al. |
| 2009/0313032 A1 | 12/2009 | Hafner et al. |
| 2009/0313098 A1 | 12/2009 | Hafner et al. |
| 2010/0013434 A1 | 1/2010 | Taylor-Haw et al. |
| 2010/0029268 A1 | 2/2010 | Myer et al. |
| 2010/0049610 A1 | 2/2010 | Ambrosio et al. |
| 2010/0049737 A1 | 2/2010 | Ambrosio et al. |
| 2010/0082277 A1 | 4/2010 | Ballard |
| 2010/0094496 A1 | 4/2010 | Hershkovitz et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0211340 A1 | 8/2010 | Lowenthal et al. |
| 2010/0211643 A1 | 8/2010 | Lowenthal et al. |
| 2010/0241560 A1 | 9/2010 | Landau-Holdsworth et al. |
| 2010/0253290 A1 | 10/2010 | Hammerstrom |
| 2010/0301810 A1 | 12/2010 | Biondo et al. |
| 2010/0315197 A1 | 12/2010 | Solomon et al. |
| 2011/0001356 A1 | 1/2011 | Pollack et al. |
| 2011/0004358 A1 | 1/2011 | Pollack et al. |
| 2011/0004406 A1 | 1/2011 | Davis |
| 2011/0007824 A1 | 1/2011 | Bridges et al. |
| 2011/0010043 A1 | 1/2011 | Lafky |
| 2011/0015799 A1 | 1/2011 | Pollack et al. |
| 2011/0016063 A1 | 1/2011 | Pollack et al. |
| 2011/0025267 A1 | 2/2011 | Kamen et al. |
| 2011/0029157 A1 | 2/2011 | Muzaffer |
| 2011/0032110 A1 | 2/2011 | Taguchi |
| 2011/0057612 A1 | 3/2011 | Taguchi et al. |
| 2011/0082621 A1 | 4/2011 | Berkobin et al. |
| 2011/0093314 A1 | 4/2011 | Redmann et al. |
| 2011/0099144 A1 | 4/2011 | Levy et al. |
| 2011/0106329 A1 | 5/2011 | Donnelly et al. |
| 2011/0130885 A1 | 6/2011 | Bowen et al. |
| 2011/0175569 A1 | 7/2011 | Austin |
| 2011/0185197 A1 | 7/2011 | Ukita et al. |
| 2011/0185198 A1 | 7/2011 | Ukita et al. |
| 2011/0185303 A1 | 7/2011 | Katagi et al. |
| 2011/0191220 A1 | 8/2011 | Kidston et al. |
| 2011/0191265 A1 | 8/2011 | Lowenthal et al. |
| 2011/0193522 A1* | 8/2011 | Uesugi .................. B60L 53/64 320/109 |
| 2011/0202192 A1 | 8/2011 | Kempton |
| 2011/0202217 A1 | 8/2011 | Kempton |
| 2011/0202418 A1 | 8/2011 | Kempton et al. |
| 2011/0202476 A1 | 8/2011 | Nagy et al. |
| 2011/0213983 A1 | 9/2011 | Staugaitis et al. |
| 2011/0224841 A1 | 9/2011 | Profitt-Brown et al. |
| 2011/0224852 A1 | 9/2011 | Profitt-Brown et al. |
| 2011/0225105 A1 | 9/2011 | Scholer et al. |
| 2011/0288700 A1 | 11/2011 | Pebbles |
| 2011/0302078 A1 | 12/2011 | Failing |
| 2011/0313603 A1 | 12/2011 | Laberteaux et al. |
| 2011/0316482 A1 | 12/2011 | Baxter et al. |
| 2011/0320056 A1 | 12/2011 | Brown et al. |
| 2012/0005031 A1 | 1/2012 | Jammer |
| 2012/0005125 A1 | 1/2012 | Jammer |
| 2012/0005126 A1 | 1/2012 | Oh et al. |
| 2012/0013301 A1 | 1/2012 | Gaul et al. |
| 2012/0019215 A1 | 1/2012 | Wenger et al. |
| 2012/0049793 A1 | 3/2012 | Ross et al. |
| 2012/0049796 A1 | 3/2012 | Fukatsu |
| 2012/0074901 A1 | 3/2012 | Mohammed |
| 2012/0086395 A1 | 4/2012 | Kim et al. |
| 2012/0093141 A1 | 4/2012 | Imes et al. |
| 2012/0112693 A1 | 5/2012 | Kusch et al. |
| 2012/0112697 A1 | 5/2012 | Heuer et al. |
| 2012/0116745 A1 | 5/2012 | Dickinson et al. |
| 2012/0126755 A1 | 5/2012 | Perisic et al. |
| 2012/0135626 A1 | 5/2012 | Tormey et al. |
| 2012/0179323 A1 | 7/2012 | Profitt-Brown et al. |
| 2012/0253567 A1 | 10/2012 | Levy et al. |
| 2012/0262104 A1 | 10/2012 | Kirsch |
| 2012/0271723 A1* | 10/2012 | Penilla .................. G07F 15/005 705/16 |
| 2012/0296678 A1 | 11/2012 | Boot et al. |
| 2013/0006677 A1 | 1/2013 | Anglin et al. |
| 2013/0020992 A1 | 1/2013 | Wu et al. |
| 2013/0080254 A1* | 3/2013 | Thramann ............... B60L 53/68 705/14.57 |
| 2013/0127417 A1 | 5/2013 | Karner et al. |
| 2013/0179061 A1 | 7/2013 | Gadh et al. |
| 2014/0203077 A1 | 7/2014 | Gadh et al. |
| 2014/0266047 A1 | 9/2014 | Robers et al. |
| 2017/0190259 A1* | 7/2017 | Penilla .................. G06F 3/0484 |
| 2018/0111494 A1* | 4/2018 | Penilla .................. B60L 53/12 |

FOREIGN PATENT DOCUMENTS

| | | |
|---|---|---|
| GB | 2460500 A | 12/2009 |
| JP | 2011-050162 A | 3/2011 |
| KR | 10-2010-0044154 A | 4/2010 |
| WO | 2009/098687 A2 | 8/2009 |
| WO | 2010/031687 A1 | 3/2010 |
| WO | 2010/033517 A2 | 3/2010 |
| WO | 2011/109460 A2 | 9/2011 |
| WO | 2011/144308 A2 | 11/2011 |
| WO | 2011/156776 A2 | 12/2011 |
| WO | 2012/012021 A1 | 1/2012 |

* cited by examiner

SYSTEMS AND METHODS FOR CHARGING OF ELECTRIC VEHICLES WITH CHARGE BALANCING BETWEEN MULTIPLE ELECTRIC VEHICLE CHARGING STATIONS IN A LOCAL AREA NETWORK

RELATED APPLICATIONS

This application is a continuation of U.S. application Ser. No. 17/129,680, filed Dec. 21, 2020, which is a continuation application of U.S. patent application Ser. No. 16/277,925, filed Feb. 15, 2019, titled Methods and Apparatuses for Charging of Electric Vehicles; which is a continuation of Ser. No. 15/158,373, filed May 18, 2016, titled Methods and Apparatuses For Charging Of Electric Vehicles, which is a continuation of U.S. patent application Ser. No. 13/655,397, filed Oct. 18, 2012, titled Methods And Apparatuses For Charging Of Electric Vehicles, which claims the benefit of U.S. provisional patent application Ser. No. 61/549,174, filed Oct. 19, 2011, titled Methods and Apparatuses for Controlled Variable Rate Charging of Electric Vehicles and also U.S. provisional patent application Ser. No. 61/620,855, filed Apr. 5, 2012, titled Management of Charging Station of Electric-Powered Vehicles Using a Mobile Device. Each of the aforementioned related patent applications is herein incorporated by reference.

BACKGROUND

Technical Field

Various technologies and techniques described herein relate to electric vehicles and systems and methods for recharging electric vehicles.

Description of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

An electric vehicle (EV) is the common name given to describing automobiles designed to operate their electric motor on a rechargeable battery. The battery is recharged when the electric vehicle is connected to an electric vehicle charging station or electric vehicle supply equipment (EVSE). Power from the electrical grid is used to "refuel" an electric vehicle.

With the rising demand for alternative modes of transportation that are environmentally friendly and operated independently of gasoline prices, electric vehicles are rising in popularity among the consuming public. However, while gas stations are located on every street corner, commercially available charging stations are not. The demand for electric vehicles remains limited by the infrastructure available for supporting the charging of the growing number of cars. Until charging an electric vehicle becomes both convenient and affordable for users, a major deterrent exists for new consumers wanting a "green" method of transportation.

Several problems currently exist in making electric vehicles ideal for personal use. First, many pure electric vehicles have severe distance limitations in comparison to their hybrid or gasoline-powered vehicle counterparts. While a tank of gasoline can be refilled in minutes, the battery on an electric vehicle may take minutes, hours, or a day to become fully recharged. Secondly, cross-country travel for electric vehicles requires charging stations in both major cities and scarcely-populated areas throughout the United States. To make electric vehicles a convenient reality, commercial charging stations cannot be limited to niche areas of the country. Personal charging stations in the home are not enough. A viable market exists for commercial charging stations capable of providing the infrastructure necessary for supporting numerous electric vehicles.

BRIEF SUMMARY

Described herein are implementations of a system for managing an electric vehicle charging station. The system may include a cloud server, an electric vehicle charging station and a network link between the charging station and the cloud server. The network link may include a mobile device disposed between the charging station and the cloud server in which the mobile device facilitates communication between the charging station and the cloud server. In one implementation, the mobile device may be a component of an electric vehicle. In one implementation, the network link may include a wireless connection between the mobile device and the charging station. In one implementation, the mobile device may connect to the charging station via a docking station. In one implementation, the mobile device may be a cell phone. In one implementation, the mobile device may use a telematics platform to communicate with the cloud server. In one implementation, the mobile device may include a mobile application for communicating with the cloud server, the charging station or both.

Further, the system may include an electric power grid, a first electric vehicle charging station connected to the power grid and a second electric vehicle charging station connected to the power grid. The first charging station may facilitate a charge transfer for an electric vehicle at the second charging station. In one implementation, the first charging station may facilitate a charge transfer for a plurality of electric vehicles at a plurality of electric vehicle charging stations.

Described herein are implementations of various techniques of a method for managing an electric vehicle charging station. The method includes a cloud server or an electric vehicle charging station receiving a request for a charge transfer for an electric vehicle over a network link between the electric vehicle charging station and the cloud server. The network link has a mobile device disposed between the electrical vehicle charging station and the cloud server. The method may further include the cloud server sending a response to the charging station enabling the charge transfer. In one implementation, the request may be received by the electric vehicle charging station or the cloud server. The method may include validating credit card information based on the request for the charge transfer. In one implementation, the request may include an identification that specifies at least one of the following: the electric vehicle charging station; the mobile device; the cloud server; a user; a vehicle; a utility account; and a communicating meter or communicating meter network. The method may include the following: receiving the identification from the mobile device; checking the identification against a plurality of available identifications to determine whether the identification is valid; generating an access key if it is determined that the identification is valid; and sending the access key over the network link. In one implementation, the access key may be randomly generated. The method may include the following: receiving the identification from the electric vehicle charging station; checking the identification against a plurality of available identifications to determine whether the identification is valid; generating an access key if it is determined that the identification is valid; and sending the access key to the electric vehicle charging station. In one implementation, the identification may be received from the electric vehicle. The method may include the following: associating the identification with one or more charging parameters; and sending the charging parameters along with the response. In one implementation, the charging parameters may include at least one of the following: a cable rating; a duty cycle for a charging current; a length of time for charging an electric vehicle; a threshold level for aggregate electrical consumption; a threshold level for instantaneous electrical consumption; a maximum allowable charge rate; a microgrid rating; a plug rating; a price of electricity; a protection fuse rating; a quantity of electricity stored within a microgrid; a specific time for completing charging an electric vehicle; a total cost of charging an electric vehicle; an operational limit set by a utility; an option for econocharging; and an option for using green energy. In one implementation, the response may include an access key for enabling the charge transfer. In one implementation, the method may include determining whether the access key is valid or not. The method may include providing power to the electric vehicle if it is determined that the access key is valid. In one implementation, the response may comprise one or more charging parameters. In one implementation, the charging parameters may include at least one of the following: a cable rating; a duty cycle for a charging current; a length of time for charging an electric vehicle; a threshold level for aggregate electrical consumption; a threshold level for instantaneous electrical consumption; a maximum allowable charge rate; a microgrid rating; a plug rating; a price of electricity; a protection fuse rating; a quantity of electricity stored within a microgrid; a specific time for completing charging an electric vehicle; a total cost of charging an electric vehicle; an operational limit set by a utility; an option for econocharging; and an option for using green energy.

Described herein are implementations of various techniques of a method for managing an electric vehicle charging station. The method may include a mobile device receiving the request for a charge transfer for an electric vehicle from the charging station over a single networked link. The mobile device may then relay the request for the charge transfer to the cloud server. In one implementation, the mobile device may be a component or module of the electric vehicle. In one implementation, over the single networked link may include a wireless connection. In one implementation, receiving the request may include receiving a signal over an audio jack.

Described herein are implementations of various techniques of a method for managing an electric vehicle charging station. The method may include a cloud server sending a request for a charge transfer to an electric vehicle charging station over a network link between the charging station and the cloud server. The network link has a mobile device disposed between the charging station and the cloud server. The cloud server may then receive a response enabling the charge transfer. In one implementation, the mobile device may be a component or module of the electric vehicle. In one implementation, the request may be sent by a cloud server to an electric vehicle charging station. The method may include validating credit card information based on the request for the charge transfer.

Described herein are implementations of various techniques of a method for managing an electric vehicle charging station. The method may include an electric vehicle charging station receiving a message from a cloud server over a network link between an electric vehicle charging station and the cloud server. The network link has a mobile device facilitating a communication between the electrical vehicle charging station and the cloud server. The charging station may send a response back to the cloud server through the mobile device. In one implementation, the message may be received by the electric vehicle charging station. In one implementation, the first mobile device may be a component or module of an electric vehicle. The method may include validating credit card information based on the message. In one implementation, the mobile device may connect to the charging station via a docking station or a charging coupler. In one implementation, the response may be sent to the cloud server via a second mobile device facilitating a second communication between the electrical vehicle charging station and the cloud server. In one implementation, the message may include a request for a charge transfer and the response may include a report regarding the charge transfer. In one implementation, receiving the message or sending the response may include synchronizing data between the charging station and the cloud server. In one implementation, receiving the message or sending the response may include a secured connection having at least one of the following: a virtual private network (VPN); and a secured socket layer (SSL). In one implementation, the message may include at least one of the following: a grid demand instruction; a grid demand schedule; a session report; billing data; electricity price data; fault data; and usage data. Likewise, the method may include the cloud server receiving a message over the network link from the charging station. The cloud server may then send a response to the charging station.

In one implementation, the cloud server or the mobile device may receive identification from the charging station, and then check the identification against other identifications to determine if the identification is valid. If the identification is valid, the cloud server or the mobile device may then generate an access key based on the identification and send the access key over the network link to the charging station to enable the charge transfer.

Described herein are implementations of various techniques of a method for managing an electric vehicle charging station. The method may also include a mobile device of a first user receiving a message from an electric vehicle charging station. The message may be in regard to a charging transfer for an electric vehicle of a second user. The mobile device may relay the message to the cloud server. In one implementation, the message may be relayed to the cloud server over a network link having the mobile device facilitating a communication between the electrical vehicle charging station and the cloud server. In one implementation, the mobile device may be a component or module of the electric vehicle. In one implementation, receiving the message or relaying the message may include synchronizing data between the charging station and the cloud server. In one implementation, receiving the message or relaying the message may include a secured connection having at least one of the following: a virtual private network (VPN); and a secured socket layer (SSL). In one implementation, the message may include at least one of the following: a grid demand response instruction; a grid demand response schedule; a session report; billing data; electricity price data; fault data; and usage data.

Described herein are also implementations of various techniques of a method for reserving an electric vehicle charging station. The method may include providing a means for communicating between a first user who is charging an electric vehicle at an electric vehicle charging station and a second user with a reserved time for charging an electric vehicle at the charging station. The method may include facilitating a request from the first user to the second user to extend an amount of time for the first user at the charging station over the second user's reserved time. The method may then facilitate a response from the second user. In one implementation, the means for communicating may include at least one of the following: short message service (SMS) text messaging; email; digital voice communication; plain old telephone service; an Internet website; instant messaging; push notifications; pop up messaging; a chat room; and an Internet forum. In one implementation, facilitating the request or facilitating the response may include facilitating a payment to or from the first user or the second user. In one implementation, the response may include a notification of acceptance or rejection of the request.

In another implementation, the request may be from the second user to occupy the charging station currently occupied by the first user. In one implementation, the means for communicating may include at least one of the following: short message service (SMS) text messaging; email; digital voice communication; plain old telephone service; instant messaging; push notifications; pop up messaging; an Internet website; a chat room; and an Internet forum. In this implementation, facilitating the request or facilitating the response may include facilitating a payment to or from the first user or the second user. In this implementation, the response may include a notification of acceptance or rejection of the request. In this implementation, the response may include a reservation ticket for using the charging station. In this implementation, the reservation ticket may include at least one of the following: a date; a time; an amount of time remaining on the reservation ticket; a valuation of the reservation ticket; and a designated electric vehicle charging station.

Described herein are also implementations of various techniques of a method for determining an availability of an electric vehicle charging station. The method may include determining the availability of the charging station from geolocation information. Geolocation information may be received by the cloud server or another device regarding a mobile device. The mobile device's geolocation information may then be compared with the geolocation information of an electric vehicle charging station to determine the distance between the mobile device and the charging station. Based on the distance, the availability of the charging station may be determined. In one implementation, receiving the first geolocation information may include detecting a connection of the mobile device at a docking station on the charging station. In one implementation, receiving the first geolocation information may include detecting a wireless connection of the mobile device. In one implementation, the wireless connection may include one of the following: Bluetooth; Near-field communication (NFC); and WiFi. In one implementation, the first or second geolocation information may include readings from at least one of the following: GPS; sonar; multilateration; RFID; and an induction coil sensor. In one implementation, determining the availability of the charging station may include detecting the mobile device arriving at the charging station. In one implementation, determining the availability of the charging station may include detecting the mobile device leaving the charging station. In one implementation, determining the availability of the charging station may include detecting the speed of the mobile device approaching the charging station, the speed being based on the first geolocation information. In one implementation, determining the availability of the charging station may include estimating the time of arrival of the mobile device based on the distance. The method may include sending a notification to a user regarding the availability. In one implementation, the notification may include one of: an amount of time before the charging station becomes available; and a number of available slots remaining at the charging station. In one implementation, the slots may be time slots or vehicle slots. The method may include determining a navigation route between the mobile device and the charging station using a third geolocation information regarding a geographical feature. In one implementation, the geographical feature may be one of the following: a road; a city; a radio tower; a physical landmark; and a commercial establishment. In one implementation, the route may be based on the speed the mobile device is approaching the charging station, and where the speed may be based on the first geolocation information.

Described herein are also implementations of various techniques of a method for managing an electric vehicle charging station. The method may include receiving geolocation information regarding a mobile device, and then comparing the geolocation information with the geolocation information of a charging station. The method may then determine the distance between the mobile device and the charging station using both geolocation information. The method may then include a cloud server or a charging station sending a message to the mobile device based on the distance. In one implementation, the message may include a receipt of a charging transaction, a remaining time of the charging transaction, an inquiry to a user as to whether the charging transaction has terminated, or combinations thereof. In one implementation, the first or second geolocation information may include readings from at least one of the following: GPS; sonar; multilateration; RFID; and an induction coil sensor. In one implementation, determining the distance between the mobile device and the charging station may include detecting the speed of the mobile device approaching the charging station, the speed being based on the first geolocation information. In one implementation, the message may be sent using a second mobile device. In one implementation, receiving the first geolocation information may include detecting a connection of the mobile device at a docking station on the charging station. In one implementation, receiving the first geolocation information may include detecting a wireless connection of the mobile device. In one implementation, the wireless connection may include one of the following: Bluetooth; Near-field communication (NFC); and WiFi.

Described herein are also implementations of various techniques of a method for managing an electric vehicle charging station. The method may include an electric vehicle charging station receiving a charging control signal from a cell phone or other mobile device over a single networked link between an electric vehicle charging station and the mobile device. The charging control signal may adjust a parameter that is used to draw electric power from the charging station, and the charging station adjusts the charge transfer based on the adjusted parameter. In one implementation, the single networked link may include a wireless connection between the cell phone and the charging station. In one implementation, the network link may include connecting the cell phone to a docking station at the charging station through one of the following: an audio jack; and a universal service bus. In one implementation, the parameter may be one of the following: a battery temperature of an electric vehicle; a charging current; a current battery charge of an electric vehicle; a length of time since an electric vehicle began charging; a price of electricity; a time of day; a time until an electric vehicle's next use; a weather reading; and an option for econocharging. In one implementation, the parameter may be one of the following: a charging cable rating; a circuit protection rating; a duty cycle for a charging current; a future power draw from an electric vehicle; a threshold level for aggregate electrical consumption; a threshold level for instantaneous electrical consumption; a local aggregate energy consumption; a maximum allowable charge rate; a minimum allowable charge rate; a microgrid rating; a present power draw from an electric vehicle; a protection fuse rating; a quantity of electricity stored within a microgrid; a total maximum allowable load on a microgrid; an operational limit set by a grid utility; and an option for using green energy. Likewise, the method may also include the charging station receiving a charging control signal for enabling or disabling a charge transfer at the charging station. The method may then include the charging station enabling or disabling the charge transfer based on the charging control signal. In one implementation, the single networked link may include a connection over an audio jack between the cell phone and the charging station.

Described herein are also implementations of various techniques of a method for managing an electric vehicle charging station. The method may include a cell phone or another mobile device sending a charging control signal over a single networked link to the charging station. A charge transfer at the charging station may then be enabled or disabled based on the charging control signal. The method may then include the mobile device receiving a response that the charge transfer has been enabled or disabled. In one implementation, the charging control signal may be based on a communication with a grid utility. In one implementation, the single networked link may include a wireless connection between the cell phone and the charging station.

Described herein are also implementations of various techniques of a method for managing an electric vehicle charging station. The method may include a cell phone sending a charging control signal to an electric vehicle charging station over a single networked link between the electric vehicle charging station and the cell phone. The charging control signal adjusts a parameter used to draw electric power from the charging station. The cell phone may then receive a response from the charging station that the charge transfer has been adjusted based on the adjusted parameter. In one implementation, the charging control signal may be based on a communication with a grid utility. In one implementation, the network link may include a wireless connection between the mobile device and the charging station. In one implementation, the network link may include a connection over an audio jack between the mobile device and the charging station. In one implementation, the parameter may be one of the following: a battery temperature of an electric vehicle; a charging current; a current battery charge of an electric vehicle; a length of time since an electric vehicle began charging; a price of electricity; a time of day; a time until an electric vehicle's next use; a weather reading; and an option for econocharging. In one implementation, the parameter may be one of the following: a charging cable rating; a circuit protection rating; a current duty cycle for a charging current; a future power draw from an electric vehicle; a threshold level for aggregate electrical consumption; a threshold level for instantaneous electrical consumption; a local aggregate energy consumption; a maximum allowable charge rate; a minimum allowable charge rate; a microgrid rating; a present power draw from an electric vehicle; a protection fuse rating; a quantity of electricity stored within a microgrid; a total maximum allowable load on a microgrid; an operational limit set by a grid utility; and an option for using green energy.

Described herein are also implementations of various techniques of a method for managing an electric vehicle charging station. The method may include an electric vehicle charging station receiving a charge control signal from a server. The charging control signal adjusts the duty cycle of a charging current. The charging station may then enable a charge transfer based on the charging current with the adjusted duty cycle. In one implementation, the server may be a cloud server. In one implementation, the server may be a local metering network server. In one implementation, the duty cycle may be determined by a total number of electric vehicles connected to a power grid. In one implementation, the charging current may be a pulse width modulated (PWM) signal. In one implementation, the duty cycle may be increased or decreased incrementally over a specified timeframe. The method may include adjusting the duty cycle based on at least one of the following: a battery temperature of an electric vehicle; a charging current; a current battery charge of an electric vehicle; a length of time since an electric vehicle began charging; a price of electricity; a time of day; a time until an electric vehicle's next use; a weather reading; and an option for econocharging. The method may include adjusting the duty cycle based on at least one of the following parameters: a charging cable rating; a circuit protection rating; a current duty cycle for a charging current; a future power draw from an electric vehicle; a threshold level for aggregate electrical consumption; a threshold level for instantaneous electrical consumption; a local aggregate energy consumption; a maximum allowable charge rate; a minimum allowable charge rate; a microgrid rating; a present power draw from an electric vehicle; a protection fuse rating; a quantity of electricity stored within a microgrid; a total maximum allowable load on a microgrid; an operational limit set by a grid utility; and an option for using green energy.

Described herein are also implementations of various techniques of a method for managing an electric vehicle charging station. The method may include sending a charging control signal to an electric vehicle charging station, where the charging control signal adjusts the duty cycle of a charging current used in a charge transfer at the electric vehicle charging station. The method may then include receiving a response from the charging station. In one implementation, a cloud server sends the charging control signal. In another implementation, a local metering network sends the charging control signal. In one implementation, the charging control signal may be sent from a cloud server. In one implementation, the charging control signal may be over a local metering network. In one implementation, the duty cycle may be determined by a total number of electric vehicles connected to a power grid. In one implementation, the charging current may be a pulse width modulated (PWM) signal. In one implementation, the duty cycle may be increased or decreased incrementally over a specified timeframe. In one implementation, the charging control signal may be determined based on at least one of the following: a battery temperature of an electric vehicle; a charging current; a current battery charge of an electric vehicle; a length of time since an electric vehicle began charging; a price of electricity; a time of day; a time until an electric vehicle's next use; a weather reading; and an option for econocharging. In one implementation, the charging control signal may be determined based on at least one of the following: a charging cable rating; a circuit protection rating; a duty cycle for a charging current; a future power draw from an electric vehicle; a threshold level for aggregate electrical consumption; a threshold level for instantaneous electrical consumption; a local aggregate energy consumption; a maximum allowable charge rate; a maximum allowable charge rate; a microgrid rating; a present power draw from an electric vehicle; a protection fuse rating; a quantity of electricity stored within a microgrid; a total maximum allowable load on a microgrid; an operational limit set by a grid utility; and an option for using green energy.

Described herein are also implementations of various techniques of a method for managing an electric vehicle charging station. The method may include sending charging controls signal between electric vehicle charging stations for adjusting a charge transfer for an electric vehicle connected to one of the charging stations. The charging station sending the charging control signal may receive a response from the charging station receiving the charging control signal. In one implementation, the charging control signal may enable or disable the charge transfer at the second charging station. In one implementation, the charging control signal may be sent to a plurality of electric vehicle charging stations. In one implementation, the charging control signal may determine a plurality of charging currents for the plurality of charging stations. In one implementation, the charging control signal may be based on a communication with a grid utility. In one implementation, the charging control signal may be determined based on at least one of the following: a battery temperature of an electric vehicle; a charging current; a current battery charge of an electric vehicle; a length of time since an electric vehicle began charging; a price of electricity; a time of day; a time until an electric vehicle's next use; a weather reading; and an option for econocharging. In one implementation, the charging control signal may be determined based on at least one of the following: a charging cable rating; a circuit protection rating; a duty cycle for a charging current; a future power draw from an electric vehicle; a threshold level for aggregate electrical consumption; a threshold level for instantaneous electrical consumption; a local aggregate energy consumption; a maximum allowable charge rate; a maximum allowable charge rate; a microgrid rating; a present power draw from an electric vehicle; a protection fuse rating; a quantity of electricity stored within a microgrid; a total maximum allowable load on a microgrid; an operational limit set by a grid utility; and an option for using green energy.

Described herein are also implementations of various techniques of a method for managing an electric vehicle charging station. The method may include a first electric vehicle charging station receiving a charging control signal from a second electric vehicle charging station. The charging control signal may then adjust a charge transfer for an electric vehicle connected to the first charging station. In one implementation, the charging control signal may enable or disable the charge transfer at the first charging station. In one implementation, the first charging station may receive a plurality of charging control signals from a plurality of electric vehicle charging stations. In one implementation, a current for charging the electric vehicle may be determined from the plurality of charging control signals from the plurality of charging stations. In one implementation, the charging control signal may be based on a communication with a grid utility. In one implementation, the charging control signal may be determined based on at least one of the following: a battery temperature of an electric vehicle; a charging current; a current battery charge of an electric vehicle; a length of time since an electric vehicle began charging; a price of electricity; a time of day; a time until an electric vehicle's next use; a weather reading; and an option for econocharging. In one implementation, the charging control signal may be determined based on at least one of the following: a charging cable rating; a circuit protection rating; a duty cycle for a charging current; a future power draw from an electric vehicle; a threshold level for aggregate electrical consumption; a threshold level for instantaneous electrical consumption; a local aggregate energy consumption; a maximum allowable charge rate; a maximum allowable charge rate; a microgrid rating; a present power draw from an electric vehicle; a protection fuse rating; a quantity of electricity stored within a microgrid; a total maximum allowable load on a microgrid; an operational limit set by a grid utility; and an option for using green energy.

Furthermore, the method may include a cloud server or electric vehicle charging station receiving a request from a first user for placement in a charging station queue. The cloud server or charging station may then assign the first user a place in the charging station queue. The cloud server or charging station may then provide a charging space at the charging station to a second user in the charging station queue, where the second user has previously been assigned a place in the charging station queue. The method may include notifying the first user that the charging space is available. The method may include receiving a request from the first user to be notified when a charging space is available. The method may include sending a request for acceptance or rejection of the charging space to the first user, and receiving a response accepting or rejecting the request by the first user. In one implementation, accepting the request may place a hold on the charging space that prevents a different user from using the charging space. In one implementation, rejecting the request may include providing the charging space to a subsequent user. In one implementation, rejecting the request may include notifying a subsequent user that the charging space is available. In one implementation, providing the charging space may include providing the charging space at any charging station amongst a group of charging stations in a geographic location. In one implementation, the charging station queue may have n total places in the queue and the first user may be assigned the nth place in the charging station queue.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
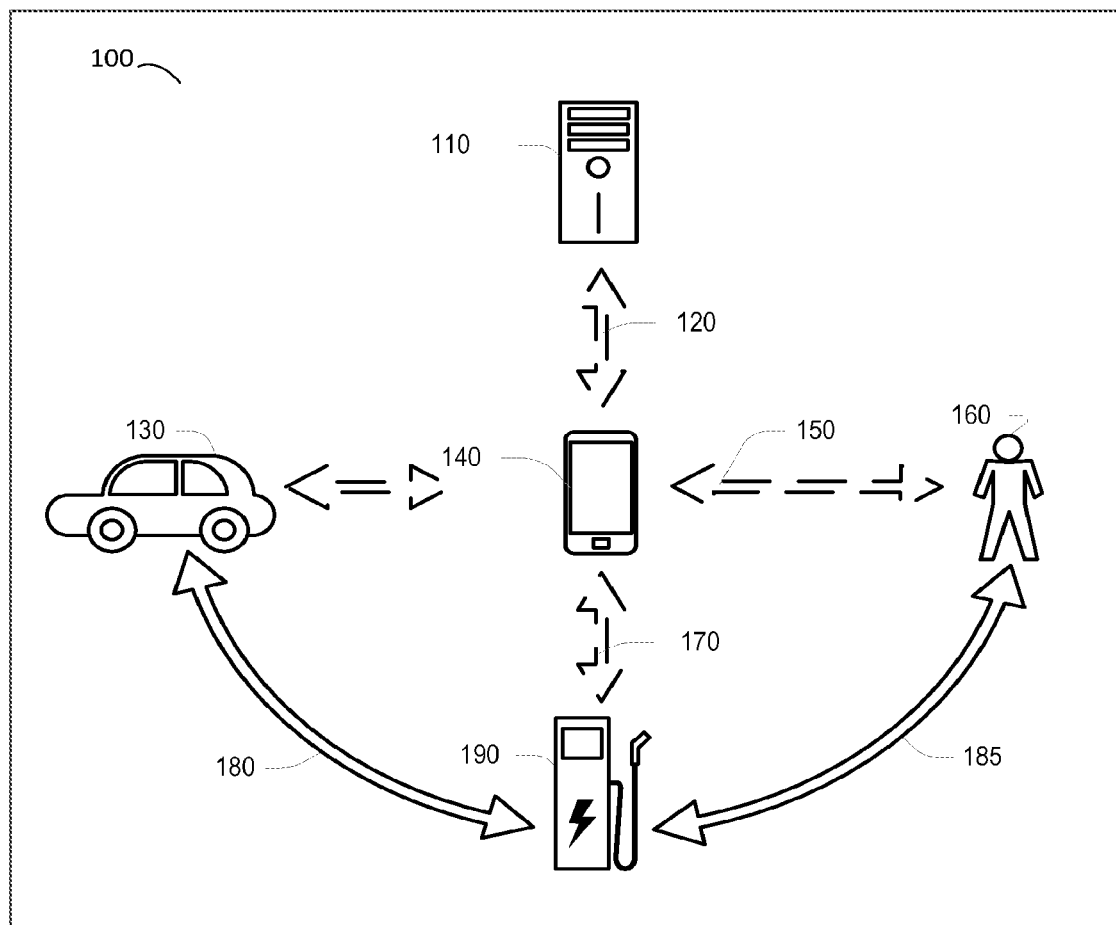
FIG. 1 illustrates an electric vehicle charging system in accordance with various techniques and technologies described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments only and is not intended to limit the claimed invention. As used herein, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Electric vehicle charging stations or electric vehicle supply equipment (EVSE) provide an electric vehicle with the capability to recharge the vehicle's battery or energy storage device. An electric vehicle may drive up to a charging station, connect to the charging station, and receive power from the electricity grid. Similar to the functionality offered by a gas station, a commercial charging station may need to provide access control, status updates, charging management and usage data.

Certain terms are defined throughout this description as they are first used, while certain other terms used in this description are defined below:

A "cloud server" is a central server or backend located remotely from the charging station and connected by means of a wide area network (WAN), such as the Internet. A cloud server may communicate with a charging station to manage and authorize charge transfers at charging stations.

A "mobile device" may be a cell phone, an iPad, a Personal Digital Assistant, a personal computer, a component/module of an electric vehicle, a device utilizing a telematics service such as one for OnStar®, or the like.

A "session report" is a detailed account of a charging transaction at a charging station, which may include billing information and usage data such as charging duration, electricity price data, energy dispensed, fault information and time information. A session report may be converted into a non-human readable format, where it may be exchanged in the background. A session report in this non-human readable format is called a session info key.

A "charging transaction" is a commercial exchange between a user and a charging station or cloud server that enables an electric vehicle to receive a charge transfer.

A "grid utility" may be a power company, energy provider, a remote server responsible for managing an electrical power grid, or other entity that may determine the cost or quantity of electricity along an electrical power grid.

Using a Mobile Device as a Means for a Charging Station to Communicate with a Cloud Server FIG. 1 illustrates an electric vehicle charging system 100 in accordance with various techniques and technologies described herein. In one implementation, the electrical charging system 100 includes a charging station 190 for an electric vehicle 130, which uses a mobile device 140 of a user 160 to communicate with a cloud server 110. The mobile device 140 may be a cell phone, but other implementations are imagined such as an iPad, a Personal Digital Assistant, a personal computer, a component/module of the electric vehicle 130, a device utilizing a telematics service such as the one for OnStar®, or the like. As an electric vehicle component, the mobile device 140 may be a permanent fixture to the vehicle, or a non-permanent fixture that is readily removable from the vehicle.

The mobile device 140 provides a connection 120 to the cloud server 110. Intermittent connections, such as wireless network connections, are depicted using arrows with segmented lines. Unbroken arrows may depict a hardwired connection, such as a connection between an electric vehicle and a charging station over a charging coupler. The connection 120 to the cloud server 110 may utilize a wireless method such as WiFi, Cellular technology (e.g., CDMA, GPRS, HSDPA, EDGE, LTE, etc.), or another wireless backhaul.

Additionally, the mobile device 140 provides a connection 170 (also called a single networked link) to the charging station 190. In this manner, the mobile device 140 may act as a network intermediary for facilitating communication between the charging station 190 and the cloud server 110. The connection 170 between the mobile device 140 and the charging station 190 may be a wireless connection over one of many wireless protocols such as Bluetooth, WiFi, Near-Field Communication (NFC), Radio Frequency Identification (RFID), or another method. The connection 170 may also be a wired connection between the mobile device 140 and the charging station 190. For a wired connection, the mobile device 140 may connect to a docking station over an audio plug or audio jack or a universal service bus (USB) or using another wired method such as over a charging coupler. A charging coupler may use power line communication to provide communication between the mobile device 140 and the charging station 190.

In another implementation, the mobile device 140, the electric vehicle 130 or the charging station 190 may utilize an alternate means of communication with the cloud server 110 by using a telematics service or another communication method. In the case of in-vehicle telematics, additional data that may not necessarily be available to the mobile device, such as the state of charge of the battery of the electric vehicle 130, may be transmitted to the cloud server 110.

Where a telematics service is being utilized, a telematics platform may aggregate data from various telematics services and use the data to support features in the cloud server 110, the mobile device 140 or the charging station 190. The telematics platform may track battery status on the electric vehicle 130, geolocation of the electric vehicle 130 or mobile device 140, any error codes relating to the electric vehicle 130 or mobile device 140, and any other relevant information. Error codes may be used to alert the electric vehicle's 130 manufacturer, or prime the charging station to reduce or stop charge if there is a potentially dangerous error on the electric vehicle. This method of information management may be used periodically at specific intervals, designated times, or anytime. For example, the mobile device 140 and the cloud server 110 may notify each other of particular events through the telematics platform. In one implementation, where the electric vehicle's 130 battery is low, the cloud server 110 or charging station 190 may use this data from the telematics platform to forecast an energy load or reserve a charging space for use by the electric vehicle 130.

Where the charging station 190 has no alternative network connection to the cloud server 110 outside of the mobile device 140, the mobile device 140 may be responsible for sending or relaying requests for electric vehicle charge transfers, charging parameters or updates to existing charging parameters between the cloud server 110 and the charging station 190. Data stored on the charging station 190 may be received or updated over the connection 170 with the mobile device 140. The cloud server 110 may receive identification information, session reports of user charging transactions, charging station status updates, and other data over the connection 120 with the mobile device 140.

The electric vehicle 130 may have a connection 180 to the charging station 190. Further, the connection 180 may include a charging coupler for transmitting charging current to the electric vehicle's 130 battery or communicating with the electric vehicle 130. Likewise, the connection 180 may be wireless, and use any wireless protocols such as WiFi.

The user 160 may input instructions and data into the mobile device 140 over a user interface on the mobile device 140. The user interface on the mobile device 140 may provide charging information related to a charge transfer, such as charging status reports for the electric vehicle 130 that may include how long until the user's 160 charge transfer is complete, whether there are any complications in the charging process, the current cost of a charging transaction, and other relevant information for the user 160.

The charging station 190 may have a user interface where the user 160 may input data into the charging station 190. The user 160 may key in data directly through the user interface at the charging station 190, connect a flash drive, a CD-ROM or another removable data storage medium to the charging station 190, present an RFID card, make a selection via keypad, keyboard or touch screen or directly use the charging station 190 without prior activation from the mobile device 140 or cloud server 110.

Figure 2:
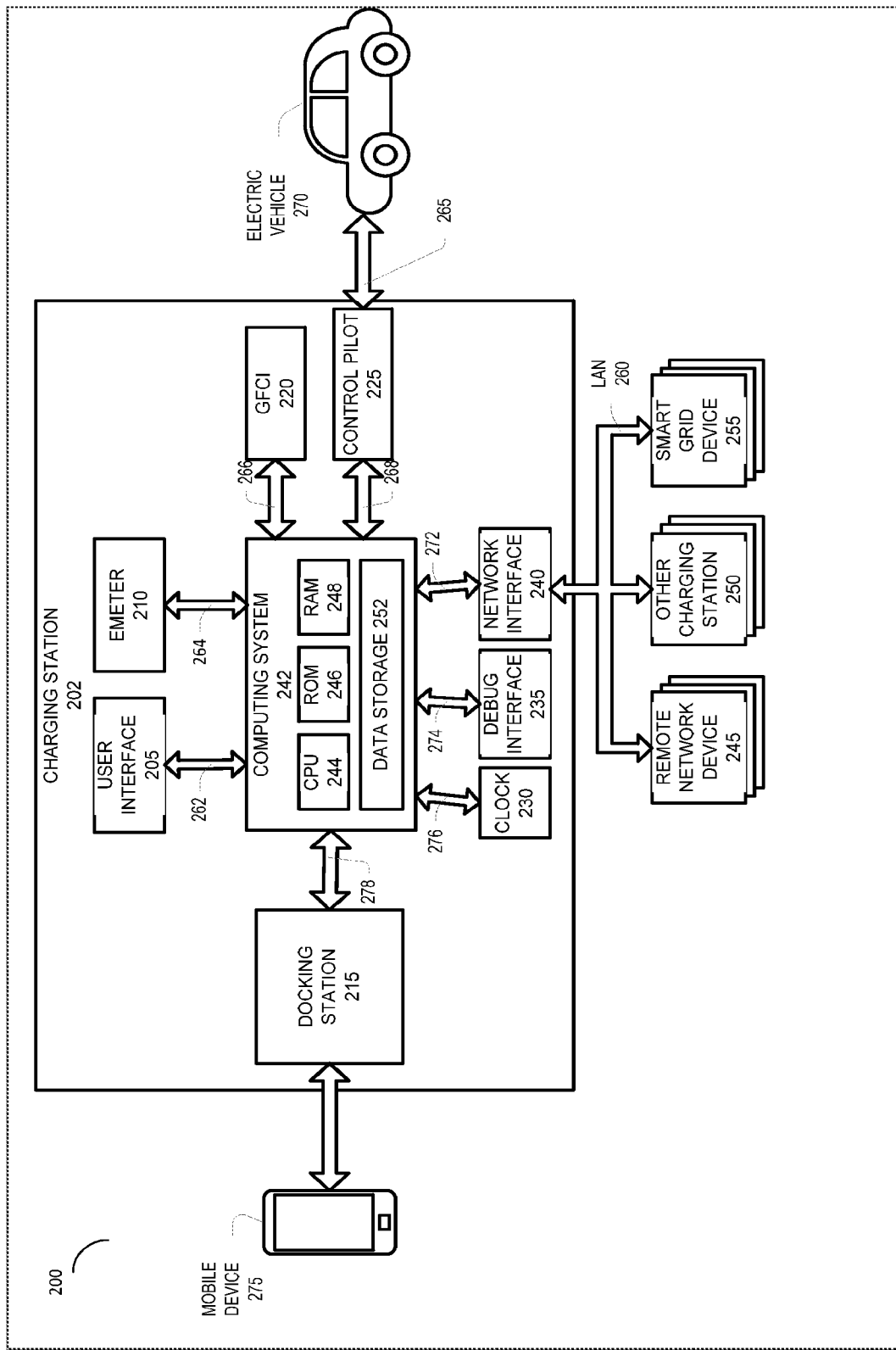
FIG. 2 illustrates an electric vehicle charging system in accordance with various techniques and technologies described herein.

FIG. 2 illustrates an electric vehicle charging system 200 in accordance with various techniques and technologies described herein. In one implementation, the electric vehicle charging system 200 includes a charging station 202 with a connection to a mobile device 275 and a connection to an electric vehicle 270 via a charging coupler 265. The charging coupler 265 is a component of the charging station 202, but in some implementations the charging coupler 265 may be an extension of the electric vehicle 270. The charging station 202 may be connected to a remote network device 245, another charging station 250, and a smart grid device 255 over a local area network (LAN) connection 260 through a network interface 240 at the charging station 202. The LAN connection 260 may be wired or wireless, internal or external to the charging station 202, or a combination thereof. In one implementation, the charging station 202 may have a docking station 215 to facilitate the mobile connection. In another implementation, a user may interact directly with the charging station 202 over a user interface 205.

The user interface 205 may have a connection 262 to a computing system 242. The computing system 242 may contain a central processing unit (CPU) 244, read only memory (ROM) 246, random access memory (RAM) 248, and a data storage 252. While only one CPU is illustrated, in some implementations, the computing system 242 may include more than one CPU. The data storage 252 may be an embedded chip on the computing system 242, off-chip, or both. The ROM 246 and the data storage 252 may be volatile or nonvolatile, and removable or non-removable storage of the computer-readable instructions, data structures, program modules and other data for the computing system 242. Data storage 252 may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store information and which can be accessed by the computing system 242.

Figure 3:
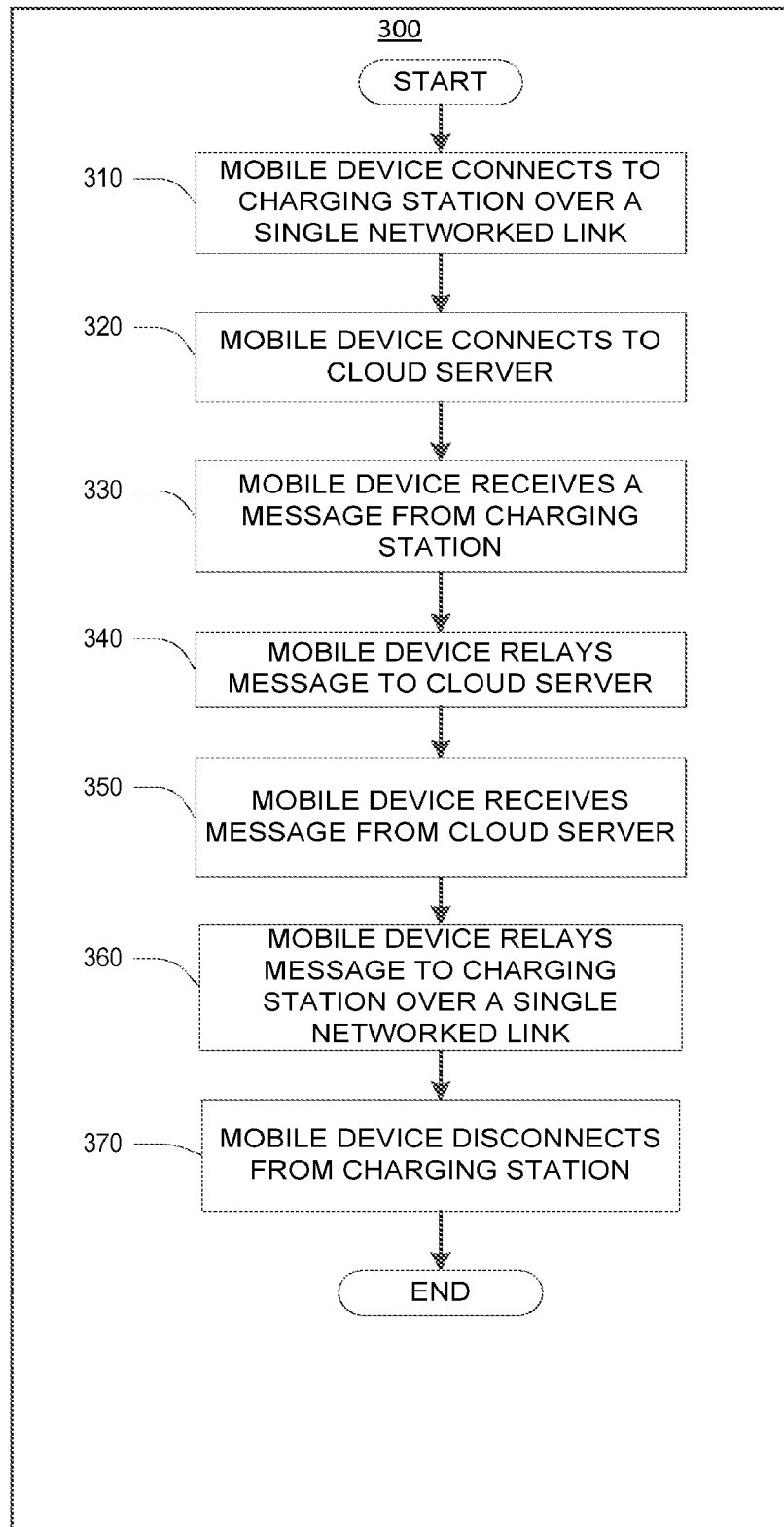
FIG. 3 illustrates a flow diagram for a method for using the mobile device as a means for the charging station to communicate with the cloud server in accordance with various implementations described herein.

The computing system 242 may have a connection 276 to a clock 230, a connection 274 to a debug interface 235, a connection 272 to the network interface 240, and a connection 264 to an EMeter 210. The clock 230 is a component that maintains the system clock for the charging station 202. The clock 230 may be synchronized with a cloud server. The debug interface 235 is a component that provides access to a device and may be either external or internal to the charging station 202 for the purpose of manipulating or monitoring the charging station 202. The device may be a system that is inaccessible to a regular user. The EMeter 210 is a component that measures energy supplied to the electric vehicle 270 through the charging coupler 265. The computing system 242 may have a connection 268 to a control pilot 225 as well as a connection 266 to a ground fault circuit interrupter (GFCI) 220. The control pilot 225 is a component that communicates with the electric vehicle 270 using the charging coupler 265 and exchanges signals and triggers to control the charging state. However, the control pilot 225 and the electric vehicle 270 may communicate wirelessly or by another wired method as well. The GFCI 220 is protection equipment that serves as a safety feature to detect a leakage current to the ground FIG. 3 illustrates a flow diagram 300 for a method for using the mobile device 140 as a means for the charging station 190 to communicate with the cloud server 110 in accordance with various implementations described herein. It should be understood that while the operational flow diagram 300 indicates a particular order of execution of the operations, in other implementations, the operations might be executed in a different order. Further, in some implementations, additional operations or steps may be added to the method. Likewise, some operations or steps may be omitted.

At step 310, the mobile device 140 connects to the charging station 190 over a single networked link. For example, the connection may be performed by a wired or wireless method, or both. In one implementation, the mobile device 140 may connect to the charging station 190 via the docking station 215, which may be part of the charging station 190 or separate. For purposes of this application, a network link and a networked link may be used interchangeably. A single networked link is defined as having no intermediary cloud server 110 or remote server between the mobile device 140 and the charging station 190. For communication over a single networked link, the mobile device 140 serves as a communication intermediary between the cloud server 110 and the charging station 190. Because the charging station may not have a hard wired or other method for connecting to a cloud server 110 or a remote server, the charging station 190 can utilize the mobile device 140 as a means to transmit information back and forth with the cloud server 110 or a remote server. This setup may make practical sense where the charging station 190 is isolated from a communication network (i.e., without phone lines, a power line communication network, etc.) or for financial or other reasons, such as to reduce hardware or software on a charging station.

Furthermore, where the charging station 190 includes a local area network, it may be unnecessary that the mobile device 140 communicate directly to the charging station 190. For instance, the mobile device 140 may communicate over the single networked link through external components, such as wireless routers, to the charging station 190.

At step 320, the mobile device 140 connects to the cloud server 110. The connection may be facilitated using a wireless method such as a WiFi, Cellular technology (e.g., CDMA, GPRS, HSDPA, EDGE, LTE, etc.), or another wireless backhaul. In one implementation, the mobile device 140 may connect to an existing network infrastructure, such as the OnStar service or another telematics service in order to communicate with the cloud server 110. The connection in step 320 may be a one-time event or involve periodic communication between the mobile device 140 and the cloud server 110.

At step 330, the mobile device 140 receives a message from the charging station 190. The message may include a grid demand instruction, a grid demand schedule, identification information, a session report, billing data, electricity price data, fault data, usage data, a request to enable or disable charge transfer, charging parameters, updates to the charging station 190, or other data or information pertaining to the charging of the electric vehicle 130.

At step 340, the mobile device 140 relays a message to the cloud server 110. The message may include a duplicate copy of the message received from the charging station 190, a message modified or adjusted by the mobile device 140, or an entirely unrelated message from the one received by the mobile device 140 in step 340.

At step 350, the mobile device 140 receives a message from the cloud server 110. This message in step 360 may be a response to the message from step 350, or be an unrelated message. The message may include an access key, charging parameters, authorization instructions, updates from the cloud server 110 for the mobile device 140 or charging station 190, or another relevant message. In one implementation, the message may be sent from a telematics platform.

At step 360, the mobile device 140 relays a message to the charging station 190 over a single networked link. The message in step 360 to the charging station 190 may comprise a duplicate copy of the message from the cloud server 110 in step 350, a message modified or adjusted by the mobile device 140, or an entirely unrelated message from the one received by the mobile device 140 in step 350.

At step 370, the mobile device 140 disconnects from the charging station 190. In one implementation, the mobile device 140 may be removed from the proximity of the charging station 190, while the electric vehicle 130 is charged by the charging station 190. The electric vehicle's 130 charge transfer may start, continue, or finish while the mobile device 140 is away from the charging station 190. In one implementation, the mobile device 140 may never return to the charging station 190, and the charging station 190 may perform all functions necessary for the charge transfer without communication with the cloud server 110 or wait until another mobile device connects to the charging station 190.

Generating an Access Key for Managing the Charging Station

Figure 4:
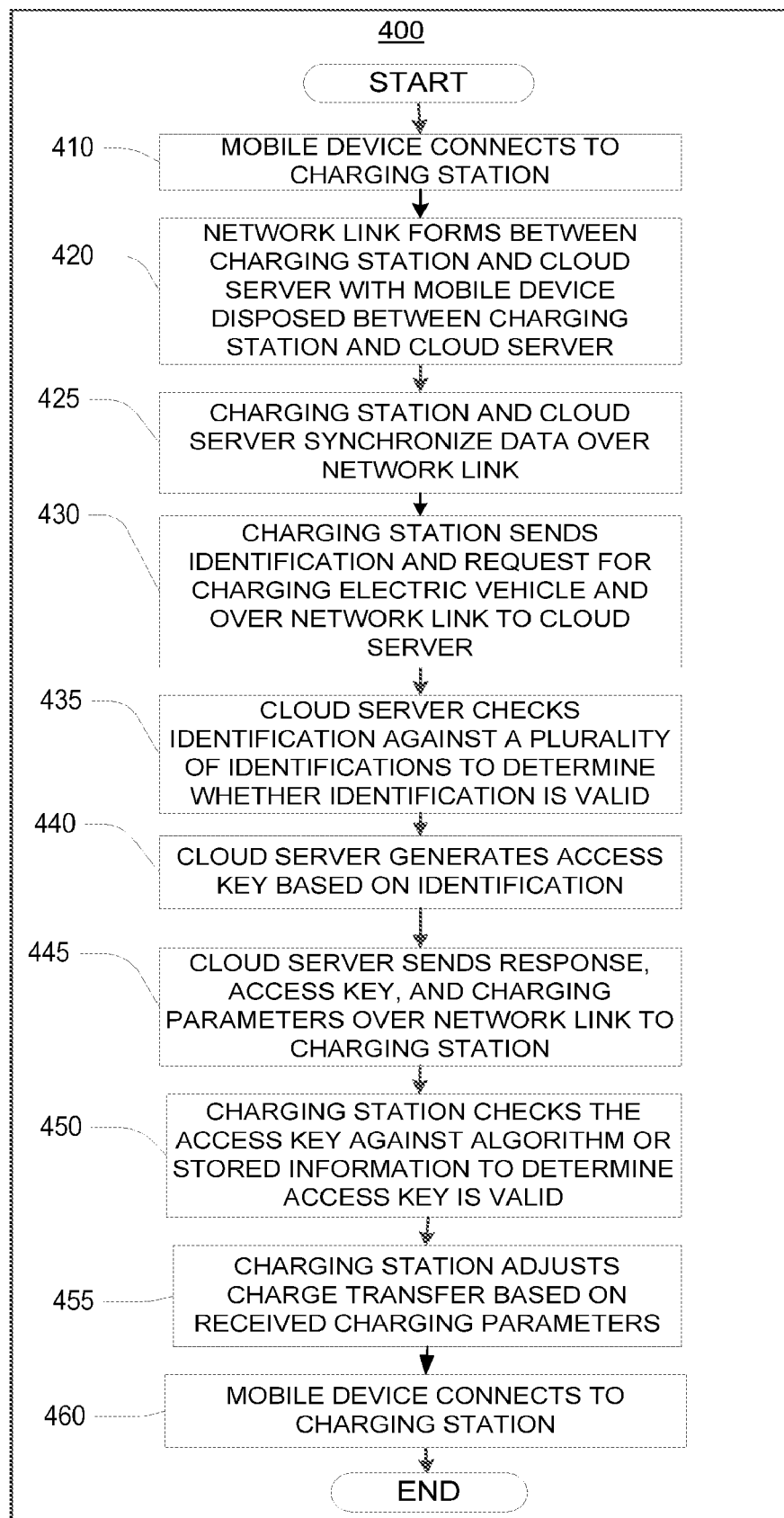
FIG. 4 illustrates a flow diagram of a method for generating an access key for managing a charging station in accordance with various implementations described herein.

FIG. 4 illustrates a flow diagram 400 of a method for generating an access key for managing a charging station in accordance with various implementations described herein. In one implementation, the method described in the flow diagram 400 may be performed by the cloud server 110 or the charging station 190. It should be understood that while the operational flow diagram 400 indicates a particular order of execution of the operations, in other implementations, the operations might be executed in a different order. Further, in some implementations, additional operations or steps may be added to the method. Likewise, some operations or steps may be omitted.

At step 410, the process starts, i.e., the mobile device 140 connects to the charging station 190. These steps are similar to steps 310-320 and are described in more detail with reference to steps 310-320. The mobile device 140 may be accompanied by a mobile application ("Mobile App"), which initiates the connection. The Mobile App may also be used to connect to the cloud server 110. Also, the connection may utilize power line communication over a charging coupler between the electric vehicle 130 and the charging station 190.

At step 420, a network link forms between the charging station 190 and the cloud server 110 with the mobile device 140 being disposed between the charging station 190 and the cloud server 110. Communication between network components may be secured via common industry methods of encryption, such as over a Virtual Private Network (VPN), Secured Socket Layer (SSL), or other secured channel communication methods.

In some implementations, communication exchanges between the mobile device 140 and the charging station 190, the charging station 190 and the cloud server 110, or the mobile device 140 and the cloud server 110 may be encrypted and encoded. This encryption is to prevent unauthorized snooping of keys that may contain activation codes and usage information. Because the keys are in a non-readable format and might be exchanged in the background, the security risks are low in the instance when someone else, other than the user 160, retrieves and sends a session report to the cloud server 110.

At step 425, the charging station 190 and the cloud server 110 synchronize data over the network link. The charging station 190 may upload session reports to the cloud server 110, or download the latest demand response schedule from the cloud server 110 during the synchronization phase. The demand response schedule may describe the charging parameters, smart charging instructions, and a timeline for charging electric vehicles at the charging station 190. This synchronization step may include sharing or matching settings between the cloud server 110 and the charging station 190, updating software on the charging station 190, performing tests to insure data integrity or appropriate hardware functionality for charging electric vehicles, and any other actions suitable for the continued quality performance of the charging station 190. Because the communication between the cloud server 110 and charging station 190 may be intermittent, it is possible that a charging station 190, which has been out of contact with the cloud server 110 for a significant period of time, may have inaccurate pricing information, settings, or a backlog of system data or session reports. This information may need to be sent to the cloud server 110.

In one implementation, data and software on the mobile device 140 may need to be synchronized with data or software on the cloud server 110. As such, the mobile device 140 may check for an active data connection to the cloud server 110 on a regular interval (e.g., daily). If a data connection is available, the mobile device 140 may connect to the cloud server 110. Otherwise, the mobile device 140 may notify the user 160 to activate a data connection and attempt to reconnect. If no connection persists, the mobile device 140 may become deactivated, either by software or hardware on the mobile device 140. A deactivated mobile device may not initiate a charge transfer at a charging station.

During synchronization, the user's 160 account linked to the mobile device 140 may be examined for accuracy, sufficient credit balance, a valid credit card accompanying the account, whether the account is valid and active, and other factors. If the user's 160 account is found to be valid and active, the cloud server 110 may send an instruction to the mobile device 140 to keep the device active for charging the electric vehicle 130. If the account is not valid or not active, the cloud server 110 may send an instruction to deactivate or prevent the mobile device 140 for use in charging the electric vehicle 130.

In another implementation, the synchronization performed in step 425 may be done through a telematics platform. For example, the electric vehicle 130 may utilize telematics services to facilitate the synchronization between the charging station 190 and the cloud server 110, but other telematics devices besides an electric vehicle are contemplated as well.

At step 430, the charging station 190 sends an identification and request for charging the electric vehicle 130 to the cloud server 110. In one implementation, the identification corresponds to the specific charging station 190. However, in some implementations, the identification may correspond to the mobile device 140, the cloud server 110, an electric vehicle, a cluster or cloud of charging stations, the user 160, the user's 160 account, a utility account, a communicating meter, a communicating meter network, a combination of these, or some other relevant part of the charging system 100.

In other implementations, the identification may be stored locally on the mobile device 140 or the cloud server 110 or another part of the charging system 100 not disclosed. The request for charging the electric vehicle 130 may be a general request or may contain specific parameters describing the charge transfer.

In another implementation, the cloud server 110 may receive the identification from the electric vehicle 130. Where the connection in step 410 is over a charging coupler, the identification may be sent through power line communication (PLC) to the electric vehicle and forwarded to the cloud server 110. Likewise, the electric vehicle 130 may transmit the identification to the cloud server 110 through a telematics platform.

Further, the user 160 may identify the charging station 190 physically on site and input this identification into his mobile device 140. In this implementation, the mobile device 140 would send the keyed-in identification to the cloud server 110 for verification. Likewise, the user 160 may say aloud the appropriate identification into a microphone. Another implementation involves the user 160 placing the mobile device 140 next to the charging station 190 in order to exchange audio signals, such as through dual-tone multi-frequency (DTMF) signaling. The identification may also be stored on the mobile device 140, and using a mobile application, may select the charging station 190 among a list of charging stations based on any number of location parameters, such as the state, city, zip code, street, or other location information.

In one implementation, the charging station 190 may freely broadcast its identification to any mobile device over a wireless or wired connection. By freely broadcasting an identification, a charging station may transmit a signal, similar to a public SSID on a wireless router, to any mobile or other device within range, alerting users to the existence or availability of the charging station 190. Likewise, the charging station 190 may require a trigger or passcode before providing its identification.

At step 435, the cloud server 110 checks the identification against a plurality of identifications to determine whether the identification is valid. The identification may be a permanent value, or be periodically changed based on time or location. The cloud server 110 may then check the identification with either previous, current, or other identifications of the same charging station 190, the mobile device 140, or the cloud server 110 to determine whether the identification is valid. The identification may be an actual value or correspond to an algorithm.

In one implementation, the identification may also describe a specific cloud or remote server. In an instance where several cloud servers or remote servers are being utilized within a network, the identification may direct the mobile device to communicate with a particular cloud server or remote server for a specific message or request.

If the identification is not valid, the user 160 responsible for requesting the charge transfer may be notified of a problem, or the charge transfer may be denied. Otherwise, the user 160 may receive a notification that the charge transfer is allowed.

In one implementation, the cloud server 110 validates credit card or other payment information based on the request from the charging station 190. The credit card information may be sent from the mobile device 140 or the charging station 190, or be stored locally on the cloud server 110.

At step 440, if it is determined that the request and identification are valid, then the cloud server 110 generates a unique access key based on the identification. Alternatively, the mobile device 140 or another component of the charging system 100 may generate the access key. The access key may be randomly generated, part of a pseudo-random sequence, or a designated key that may periodically be changed or updated. Where no connection is available, the mobile device 140 may be programmed to generate an access key, or a special access key may be stored for these types of situations. The access key is used for authenticating the user 160, activating the charging station 190, and may contain charging parameters or charging preferences or charging session information embedded in the key.

At step 445, the cloud server 110 sends a response, the access key, and charging parameters over the network link to the charging station 190. Upon receiving the access key, the mobile device 140 relays the access key to the charging station 190 to enable the electric vehicle's 130 charge transfer. The response may include limitations on the future charge transfer, a time period where the access key may be valid, a restatement of data included in the earlier request, or other information. The cloud server 110 may send the access key to the mobile device 140 or to the charging station 190 via an alternate network path.

The charging parameters sent by the cloud server 110 and used throughout the charging system 100 may include the following: a cable rating of a charging coupler, a duty cycle for a charging current, a length of time for charging an electric vehicle, a threshold level for aggregate electrical consumption, a maximum allowable charge rate, a microgrid rating, a plug rating, a price of electricity, a protection fuse rating, a quantity of electricity stored within a microgrid, a specified time for completing the charging of an electric vehicle, a total cost of charging an electric vehicle, an operational limit set by a grid utility or other energy provider, a battery temperature of an electric vehicle, a current battery charge of an electric vehicle, a time of day, a time until an electric vehicle's next use, a weather reading, a future power draw from an electric vehicle, a level for instantaneous electric consumption, a present power draw from an electric vehicle, a quantity of electricity stored within a microgrid, an option for econocharging, and an option for using green energy. Econocharging allows a user to reduce the overall cost of a charging transaction for an electric vehicle by scheduling the charge transfer around times or days where electricity is sold at a lower price than another time. Green energy refers to electricity generated from wind turbines, solar power, hydroelectric power, or another renewable energy resource. Likewise, one or more charging parameters may be associated with a particular identification or user account.

At step 450, in response to receiving the response, the access key, and the charging parameters from the cloud server 110, the charging station 190 may check the access key against an algorithm or stored information to determine whether the received access key is valid. The charging station 190 may store specific access keys for specific periods of time to determine validity. If the access key is determined by the charging station 190 to be valid, a charging current may be enabled for the electric vehicle 130.

At step 455, the charging station 190 may adjust the electric vehicle's 130 charge transfer based on the received charging parameters. For example, the charging station 190 may adjust the default charge settings using the new charging parameters or simply replace old parameters values with the new ones. The charging station 190 may adjust the charge transfer throughout the actual charging process or before charging begins. The charging station 190 may also intermittently receive new charging parameters or periodically check for current charging parameters to see if the charging transfer needs to be adjusted accordingly.

At step 460, the mobile device 140 disconnects from the charging station 190. The mobile device 140 may leave the charging station's 190 proximity, while the electric vehicle 130 remains charging. The mobile device 140 may never return to the charging station 190, but the control pilot 225 may continue to perform all functions necessary for charge transfer. Where the charge transfer ends without fully completing a charge transfer or because of some unexpected result, the charging station 190 may start a new charge transfer without communicating with the cloud server 110. Likewise, the charging station 190 may wait until another mobile device connects to the charging station 190 in order to obtain a new access key or authorization for a charge transfer.

Figure 5:
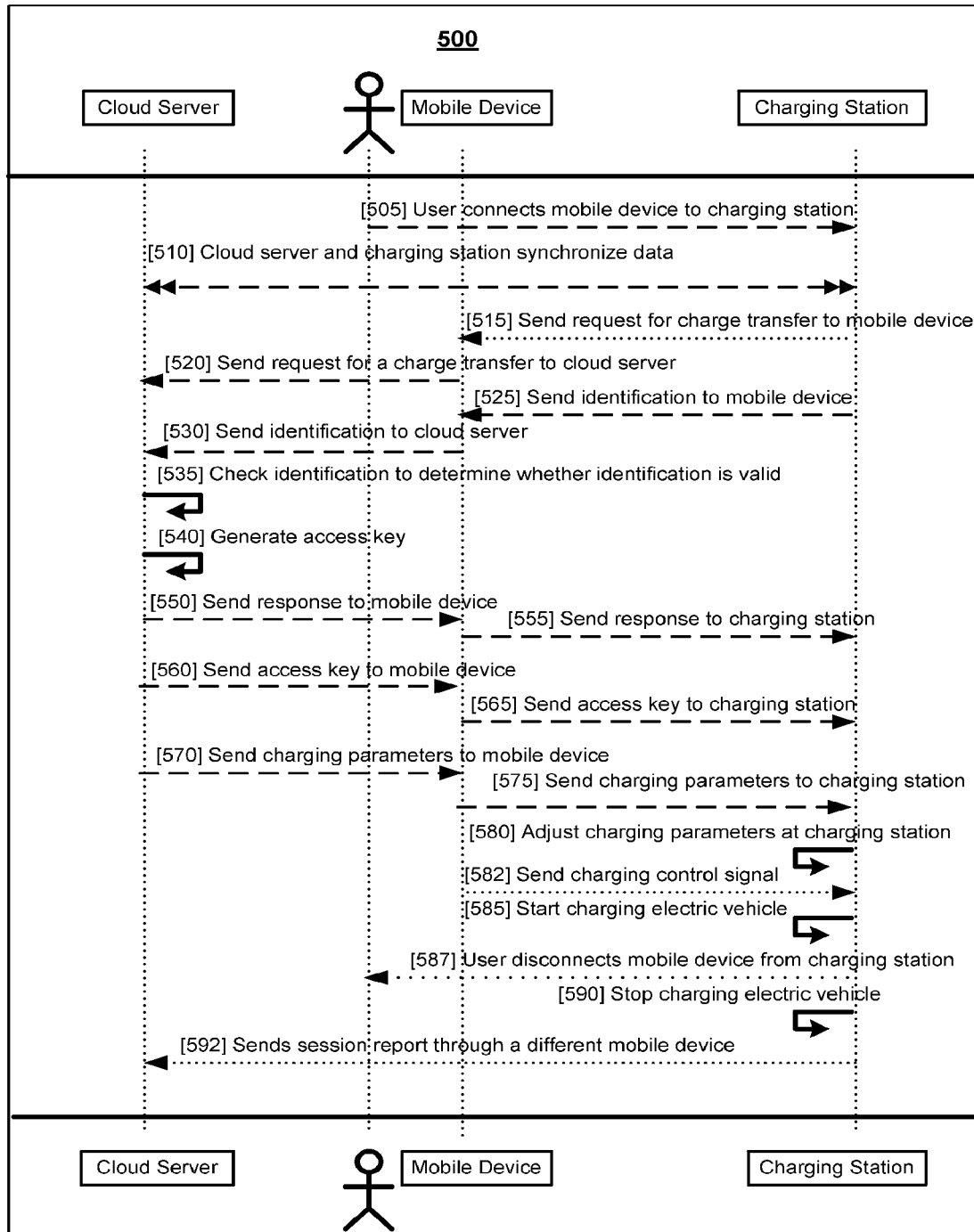
FIG. 5 illustrates a signal diagram for a method for enabling a charge transfer for an electric vehicle at a charging station in accordance with various implementations described herein.

FIG. 5 illustrates a signal diagram 500 for a method for enabling a charge transfer for an electric vehicle at a charging station in accordance with various implementations described herein. In one implementation, the method described in the signal diagram 500 may be performed by the cloud server 110, the mobile device 140, and the charging station 190. It should be understood that while the operational signal diagram 500 indicates a particular order of execution of the operations, in other implementations, the operations might be executed in a different order. Further, in some implementations, additional operations or steps may be added to the method. Likewise, some operations or steps may be omitted.

At step 505, the user 160 connects the mobile device 140 to the charging station 190. At step 510, the cloud server 110 and the charging station 190 synchronize data over the network link facilitated by the mobile device 140. At optional step 515, the charging station 190 sends a request for charge transfer to the mobile device 140. This step may be optional, because the mobile device 140 may initiate the request itself. At step 520, the mobile device 140 sends a request for charge transfer to the cloud server 110. At step 525, the charging station 190 sends identification corresponding to the specific charging station 190 to the mobile device 140. At step 530, the mobile device 140 sends the identification to the cloud server 110. At step 535, the cloud server 110 checks the identification to determine whether the identification is valid. At step 540, the cloud server 110 generates an access key. At step 550, the cloud server 110 sends a response to the request for charge transfer to the mobile device 140. At step 555, the mobile device 140 sends a response to the request for charge transfer to the charging station 190. At step 560, the cloud server 110 sends the access key to the mobile device 140. At step 565, the mobile device 140 sends the access key to the charging station 190. At step 570, the cloud server 110 sends charging parameters to the mobile device 140.

At step 575, the mobile device 140 sends charging parameters to the charging station 190. At step 580, the charging station 190 adjusts charging parameters for the charge transfer. Types of charging parameters and regulating the charging of an electric vehicle through adjusting charging parameters will be described in more detail with reference to FIGS. 15-17. Although the response, the access key and the charging parameters have been described as being sent sequentially, in some implementations they may be sent all at once, i.e., simultaneously.

At optional step 582, the mobile device 140 sends a charging control signal to the charging station 190. Further, the charging control signal may be sent to the control pilot 225 before, during, or after the charge transfer. Charging control signals may provide instructions for the charging station 190, as well as constraints or requirements for the control pilot 225. These constraints or requirements may correspond to charging parameters as noted above in step 445. Likewise, the mobile device 140 may not send a charging control signal, and, instead, the control pilot 225 may have various actions predetermined by the charging station's 190 hardware or software.

At step 585, the charging station 190 starts charging the electric vehicle 130. At optional step 587, the user 160 may disconnect the mobile device 140 from the charging station 190.

At step 590, the charging station 190 stops charging the electric vehicle. In one implementation, there may be a delay of a predefined interval before deactivating the control pilot 225, so that in case of accidental unplugging or the user 160 changes his mind, the charging station 190 may resume charging without having to repeat any previous steps of method 500.

At optional step 592, the charging station 190 may send a session report involving the previous charge transfer through a different mobile device to the cloud server 110. Alternatively, if the mobile device 140 has not been disconnected from the charging station 190 or the user 160 reconnects the mobile device 140, the session report may be sent through that mobile connection. The session report may be converted into a session info key before being transmitted to the cloud server 110. This approach of using another user's mobile device to communicate with the cloud server 110 is described in more detail below with reference to FIGS. 6-7.

Using Another User's Mobile Device to Communicate with Cloud Server

Figure 6:
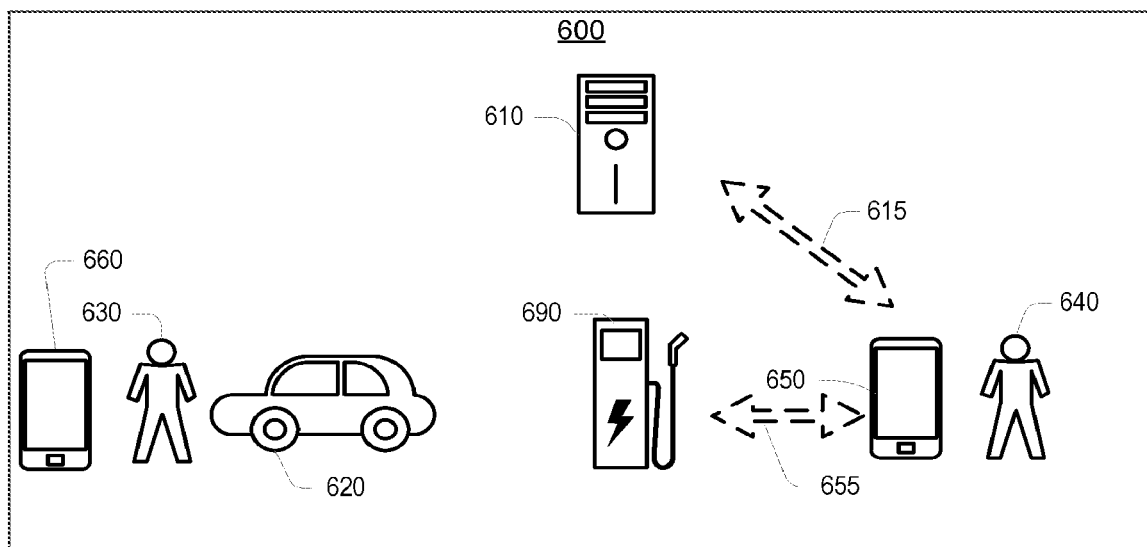
FIG. 6 illustrates an electric vehicle charging system in accordance with various techniques and technologies described herein.

FIG. 6 illustrates an electric vehicle charging system 600 in accordance with various techniques and technologies described herein. The charging system 600 includes a charging station 690 for charging electric vehicles as described by FIGS. 1-5. In one instance, a first mobile device 660 initiates a charge transfer at the charging station 690 for an electric vehicle 620. In this scenario, the electric vehicle's 620 owner 630 leaves the charging station 690 during the charge transfer and returns to the charging station 690 to pick up the electric vehicle without reconnecting the first mobile device 660. Doing so results in the charge transfer's session report remaining on the charging station 690, because no uplink currently exists to a cloud server 610. However, a second mobile device 650 may eventually come along. When a second user's 640 mobile device 650 connects to the charging station 690 over a single networked link 655 as described in FIGS. 3-5, the session report regarding the earlier charge transfer may be uploaded over a network connection 615 to the cloud server 610. This method of using a second mobile device 650 to upload data relating to a different mobile device or electric vehicle is nicknamed the piggybacked approach.

Figure 7:
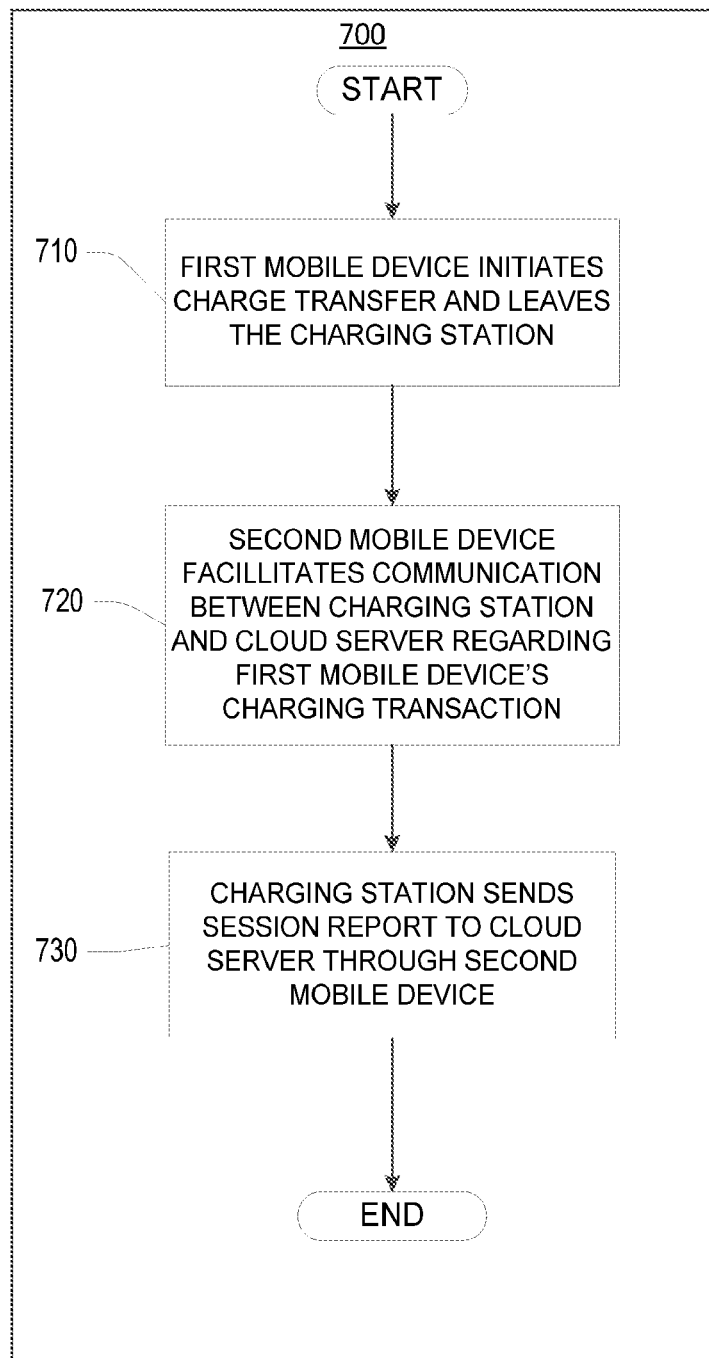
FIG. 7 illustrates a flow diagram for a method for using another user's mobile device to communicate with a cloud server.

FIG. 7 illustrates a flow diagram 700 of a method for using another user's mobile device to communicate with a cloud server. In one implementation, the method described in the flow diagram 700 may be performed by the mobile device 660 and with reference to FIG. 6. It should be understood that while the operational flow diagram 700 indicates a particular order of execution of the operations, in other implementations, the operations might be executed in a different order. Further, in some implementations, additional operations or steps may be added to the method. Likewise, some operations or steps may be omitted.

This method, nicknamed the piggybacked approach, may prove useful where an electric vehicle's user initiates a charging transaction, leaves the charging station 690 without a mobile device, and returns to pick up his electric vehicle without his mobile device. Under these circumstances, the charging station 690 may be unable to connect to the cloud server 610, and would need to wait for another opportunity to upload the charge transfer's session report.

At step 710, the first mobile device 660 initiates a charging transaction for the electric vehicle 620, and then, subsequently, the mobile device 660 leaves the charging station 690. The user 630 of the electric vehicle 620 may leave his car parked at the charging station overnight or go shopping or engage in any other activity that may cause him to leave his charge transfer unattended. The charge transfer may also finish before the user 630 returns to pick up his electric vehicle 620, and the cloud server 610 may find it valuable to receive the session report associated with the charging transaction as soon as possible.

At step 720, the second mobile device 650 facilitates communication between the charging station 690 and the cloud server 610 regarding the first mobile device's 660 charging transaction. This step may include creating a network link between the charging station 690 and the cloud server 610 through the second mobile device 650, similar to how the method was performed in FIGS. 4-5. The network link may include the single networked link 655 between the charging station 690 and the second mobile device 650 and the network connection 615 between the second mobile device 650 and the cloud server 610.

In one implementation, where the charging station 690 needs to communicate to the telematics platform without an independent connection at the charging station 690, the charging station 690 may use the method of communication facilitated in step 720 to accomplish this task.

At step 730, the charging station 690 sends session report to the cloud server 610 through the second mobile device 660. Besides a session report, the charging station 690 may upload data, charging parameters, charging control signals or other information regarding the first mobile device's 660 charging transaction.

In one implementation, the charging station 690 may also use this opportunity to download data, charging parameters, updates or other information for use in modifying an ongoing charge transfer for an electric vehicle without a corresponding mobile device. The cloud server 610 may also need to send the charging station 690 instructions to reserve specific charging spaces at the charging station 690.

Reservation

Figure 8:
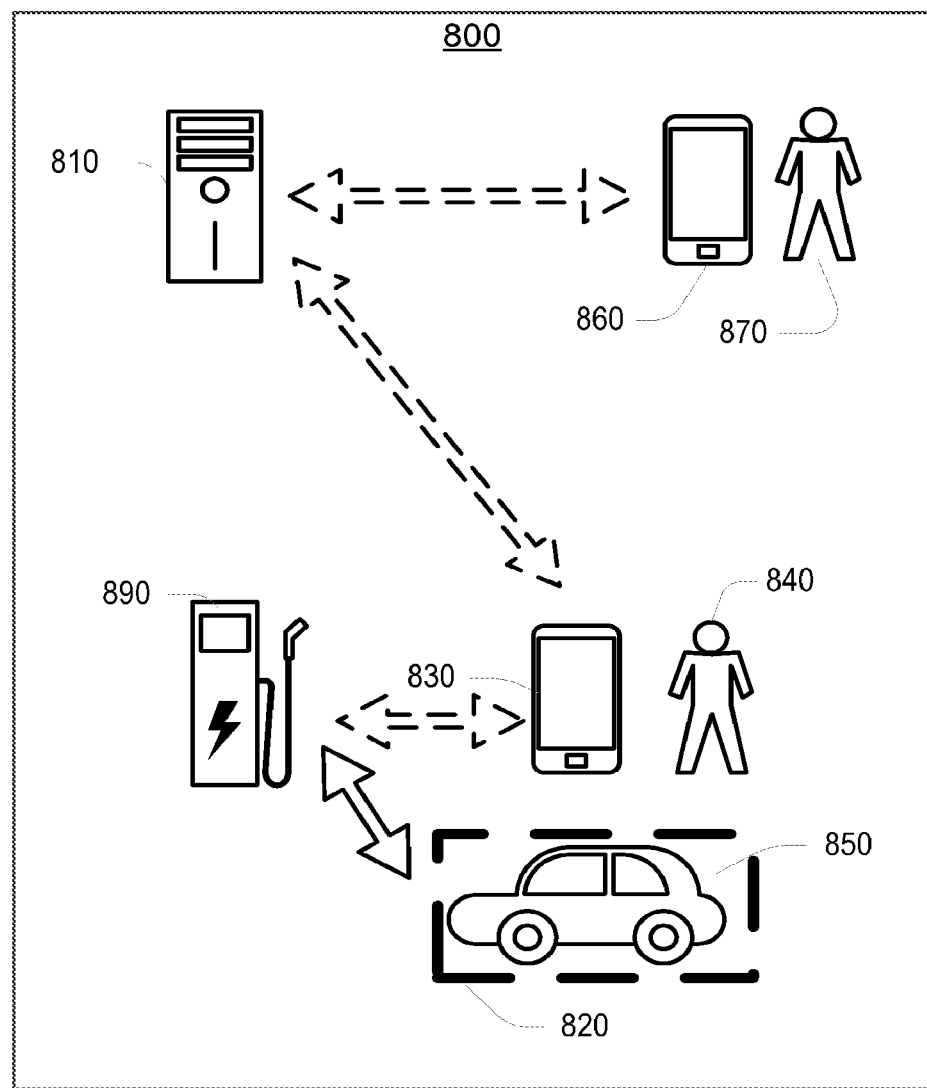
FIG. 8 illustrates an electric vehicle charging system in accordance with various techniques and technologies described herein.

FIG. 8 illustrates an electric vehicle charging system 800 in accordance with various techniques and technologies described herein. The charging system 800 includes a charging station 890 for electric vehicles. The events depicted in FIG. 8 may be happening simultaneously or in a different order from how they are described. FIG. 8 shows a first user 840 occupying a charging space 820 with an electric vehicle 850 and initiating a charge transfer with his mobile device 830. A second user 870 contacts a cloud server 810 using his mobile device 860 to obtain a reservation ticket (not shown) for the charging space 820 at a specific time. The reservation ticket may reserve the occupied charging space for a specific time period that may be hours, days, or weeks later. In one implementation, the first user 840 may use his mobile device 830 to communicate over the cloud server 810 with the second user 870 regarding his reservation ticket. In another implementation, obtaining the reservation ticket from the cloud server 810 may be facilitated through a telematics platform. The telematics platform may also facilitate communications regarding the reservation ticket, such as between users or changes to the reservation at the cloud server 810. Various reservation techniques are described in more detail in the paragraphs below with reference to FIGS. 9 and 10.

In another implementation, the second user 870 may transmit a request to the cloud server 810 using his mobile device 830 to be assigned a place in a charging station queue for a future available charging space. The charging station queue may be a table or a database that determines the order that users may receive available charging spaces. For example, the charging station queue may be a list of users, where the highest user on the list is the next user that receives the next available charging space at a charging station or amongst a group of charging stations in a geographic area. When the second user 870 reaches the top of the queue and the charging space 820 becomes or is about to become available, the second user 870 may receive a notification from the cloud server 810 that the charging space 820 is available or will soon be available for a charging session. The notification from the cloud server 810 may contain a request for acceptance or rejection of the charging space 820. The second user 870 may transmit a response to the cloud server 810 accepting or rejecting the available charging space 820. If an available charging station is accepted by the second user 870, a temporary hold is placed on the available charging space 820 to prevent a different user from occupying the available charging space 820 until the second user 870 arrives. If an available charging station is rejected by the second user 870, a notification is sent by the cloud server 810 to the subsequent user in the charging station queue. For more information about charging station queues, see step 930 in FIG. 9.

Figure 9:
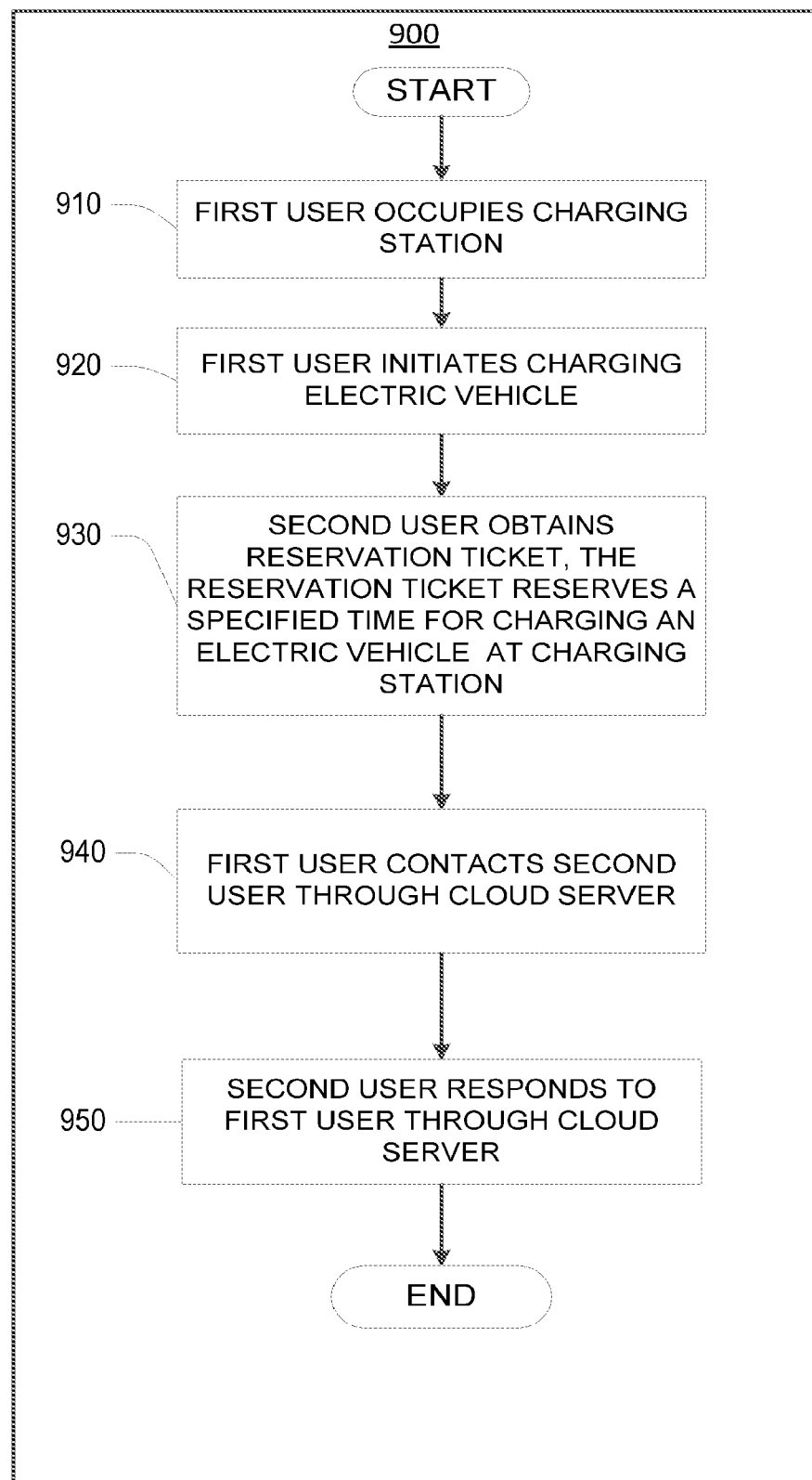
FIG. 9 illustrates a flow diagram for a method for extending a user's reservation time at a charging station in accordance with various techniques and technologies described herein.

FIG. 9 illustrates a flow diagram 900 of a method for extending a user's reservation time at a charging station in accordance with various techniques and technologies described herein. In one implementation, the method in the flow diagram 900 is performed by the cloud server 810 and with reference to FIG. 8. It should be understood that while the operational flow diagram indicates a particular order of execution of the operations, in other implementations, the operations might be executed in a different order. Further, in some implementations, additional operations or steps may be added to the method 900. Likewise, some operations or steps may be omitted.

At step 910, a first user 840 occupies a charging space 820 at the charging station 890 with an electric vehicle 850. Each charging station may be divided into several charging spaces, where each charging space has room for an electric vehicle to attach to a charging coupler. In some implementations, a charging space may be open for anyone to drive up and use the space to charge their electric vehicle. On the other hand, charging spaces may include a physical enclosure that limits access only to authorized users. The first user 840 may obtain access to the charging space 820 through communicating with the charging station 890 either through the user interface 205, by connecting the mobile device 830 to the docking station 215, or through a wireless connection.

At step 920, the first user 840 initiates the charging of the electric vehicle 850.

At step 930, a second user 870 obtains a reservation ticket for charging an electric vehicle at the charging station 890. While the second user 870 may obtain the reservation ticket after the first user 840 begins charging the electric vehicle 850 or occupying the charging space 820, this event may have happened simultaneously or at an earlier time than steps 910-920. The reservation ticket may specify a date and time when the user 870 may charge an electric vehicle at a designated charging station. The ticket may include a time interval, e.g., minutes, hours, or days. In one implementation, the second user 870 may receive the reservation ticket through a mobile application on his mobile device 860 or through a website connected to the cloud server 810. This reservation ticket may be stored digitally on a user's mobile device without the need for verification from the cloud server 810. Likewise, reservation tickets may be recorded and tracked on a database at the cloud server 810. Reservation tickets may be associated with user accounts, specific electric vehicles, or specific charging stations. In another implementation, a user may receive a physical reservation ticket that enables the charging of an electric vehicle at a charging station without a mobile device.

In another implementation, the reservation ticket may correspond to a place in a charging station queue, where the charging station queue determines what user receives access to the next available charging space. The charging station queue may be for a single electric vehicle charging station or a group of charging stations in a geographic location. Likewise, the initial place that a reservation ticket is assigned in the charging station queue may be determined by "first in time, first in right", a priority system giving preferences to specific users or classes of users, or a weighting system taking into account such factors as the time the reservation ticket was made, additional financial compensation paid for the reservation ticket outside the regular price, the expected time a vehicle will occupy the available charging space, the preferred location of the user, or any other factors. In another instance, there may be "n" total places in the queue, where n is a positive integer, and the most recently obtained reservation ticket is for the nth place. In another implementation, the reservation ticket may contain a request by a user to be notified when a charging space becomes available.

When a charging space becomes available, the next user in the charging station queue may receive a notification from the cloud server 810 that a charging space is available for use. The user with the reservation ticket may accept or reject the available charging space in a response back to the cloud server 810. If the offer for the available charging space is accepted, a temporary hold is placed on the charging station preventing other users from occupying the available charging space until the user with the reservation ticket arrives. If the user rejects the offer to use the available charging space, the user may receive an offer for the next available charging space, be removed from the charging station queue, or allocated a new place in the charging station queue based on the same or different weighting factors for determining the initial place in the charging station queue. If the offer is rejected, the subsequent user corresponding to the reservation ticket with the next place in the charging station queue may receive a subsequent offer for the available charging space.

In another implementation, instead of reserving specific times at charging stations, the reservation ticket may correspond to an available charging window at individual or multiple charging stations. During a charging window, the owner of the reservation ticket does not have a mandatory right to a charging space at a charging station. If a charging space is available, he merely has priority over a user without a reservation ticket during that charging window. Charging windows may be for minutes, hours, or days.

In yet another implementation, the reservation ticket may include an amount of charge transfer allowed from the charging station 890. This method of using reservation tickets for determining and allocating charge transfer provides a valuable management tool across a power grid. In some cases, there may be a hard or variable limit on the aggregate amount of charge available from the power grid connected to the charging station 890. If the aggregate amount is a hard limit, once all the charging current or charge transfer is allotted for electric vehicles or other devices, the charging station 890 cannot charge additional vehicles. Once all charge transfer is allocated through reservation tickets or actual charging of electric vehicles, no additional electric vehicles may use the charging facilities. If the aggregate amount corresponds to a variable limit, additional electric vehicles seeking charge transfer may simply incur an additional cost for electricity. In this situation, a reservation ticket may allow someone to lock in a specific price for charging their electric vehicle.

In still another implementation, a user without a reservation ticket may use the charging station 890 until a user with a reservation ticket claims his spot.

In another implementation, a reservation ticket may be a general ticket and be redeemable at any charging station at any time. Each reservation ticket may have a valuation attached to the reservation ticket in case the ticket's owner may want to assign or be reimbursed for the ticket from the cloud server 810. Furthermore, a general ticket may be assignable amongst users or may be returned to the cloud server 810 for monetary or another form of reimbursement.

At step 940, the first user 840 contacts the second user 870 through the cloud server 810. The cloud server 810 may facilitate communication between users connected to the charging station 890 or the cloud server 810. Communication between users may utilize a variety of different methods, including email, digital voice communication, plain old telephone service, instant messaging, push notifications, pop up messaging, an Internet website, a chat room, an Internet forum, short message service (SMS) text messaging, or another method. The first user 840 may contact the second user's 870 mobile device 860 directly, or the cloud server 810 may receive and relay messages to individual users.

In one implementation, the first user 840 communicates a request through the cloud server 810 to the second user 870 for extending charging time over the second user's 870 reserved time. For example, the request may be an informal communication, where the second user 870 simply agrees to arrive at the charging station 890 at a later time. If the request is a formal communication, the cloud server 810 may modify the second user's 870 reservation ticket with a new reserved time or the second user 870 may be assigned to a new charging station. A reason for such a request by the first user 840 may be that the first user 840 decides his electric vehicle 850 needs more charge than originally anticipated when the charge transfer began. Alternatively, the first user 840 may simply need to occupy the charging space 820 due to unforeseen events preventing the first user's 840 immediate return to his electric vehicle 850.

In another implementation, the second user 870 may be reimbursed for the inconvenience or the reduced charging time. A user who is reimbursed for his reserved time may be paid directly by a user, or indirectly using the cloud server 810. On the other hand, the first user 840, who is requesting an extension of time, may receive an additional cost to his charging transaction for going over his allotted time.

In another implementation, if the first user 840 occupies the charging space 820 during someone else's reserved time, the first user 840 may be penalized or fined if he refuses to move his electric vehicle 850. Penalties may be tracked by the cloud server 810 and potentially result in users having their accounts deactivated. Deactivation results in a mobile device or a user's account being locked and unable to access account services or initiate a charging transaction.

At step 950, the second user 870 responds to the first user 840 through the cloud server 810. For example, the second user 870 may grant or deny the extension of time for the first user 840. If the second user 870 grants the extension of time, the first user's 840 charge transfer may be adjusted with new charging parameters from the cloud server 810. If the second user 870 denies the extension of time, the first user's 840 charge transfer will end when the reserved time begins or at a specified time before the reserved time.

In one implementation, regardless of whether the extension of time is granted or denied, the first user 840 may receive a notification on his mobile device 830 alerting him to the status of his request. The notification may state whether there is acceptance or rejection of the offer.

In another implementation, the communication between the first user 840 and second user 870 may be formal or informal. For an informal communication, the second user 870 may simply communicate a message to the first user 840. If the request is formal, the second user 870 may agree to an official assignment that authorizes the cloud server 810 to modify the second user's 870 reservation ticket. An official assignment may include a user agreeing to a notification on his or her mobile device or transmitting a password or security information to the cloud server 810. In one implementation, the second user 870 or the first user 840 may place formal requirements or conditions on extending the reserved time. These conditions may include a monetary payment or a specific amount of time that the first user 840 may use the charging station 890.

Figure 10:
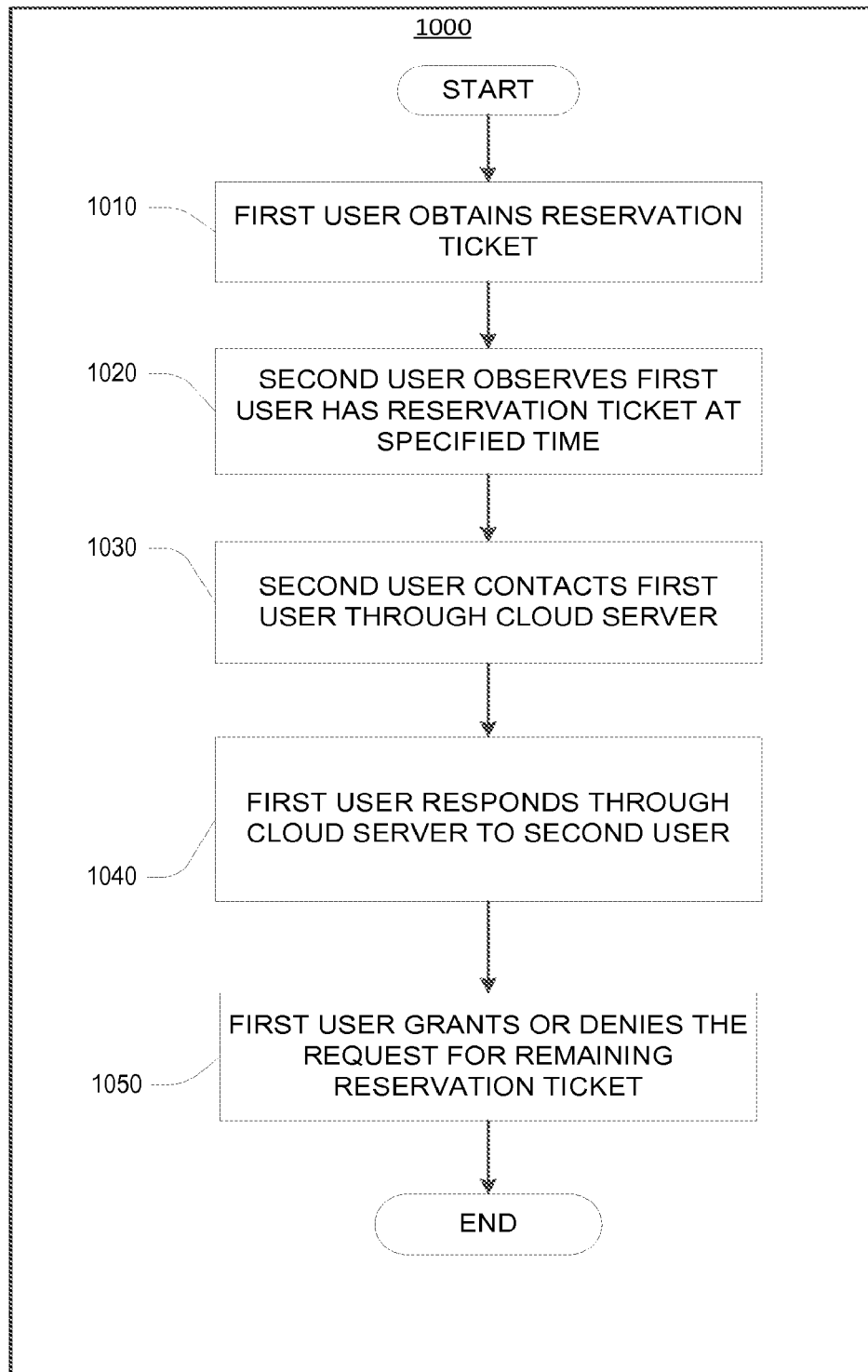
FIG. 10 illustrates a flow diagram for a method for reserving and/or assigning a user's reservation time at a charging station in accordance with various techniques and technologies described herein.

FIG. 10 illustrates a flow diagram 1000 of a method for reserving and/or assigning a user's reservation time at a charging station in accordance with various techniques and technologies described herein. In one implementation, the method in the flow diagram 1000 may be performed by the cloud server 810. It should be understood that while the operational flow diagram 1000 indicates a particular order of execution of the operations, in other implementations, the operations might be executed in a different order. Further, in some implementations, additional operations or steps may be added to the method. Likewise, some operations or steps may be omitted.

At step 1010, the first user 840 obtains a reservation ticket for charging his electric vehicle 850 at the charging station 890.

At step 1020, the second user 870 observes that the first user 840 has a reservation ticket. An internet website or a reservation user interface may display charging reservations for specific charging spaces, dates, and times, where one of the displayed reservations corresponds to the first user's 840 reservation ticket. The website or reservation user interface may identify the first user 840 in possession of the reservation or may keep the person anonymous.

At step 1030, the second user 870 contacts the first user 840 through the cloud server 810. For example, the second user 870 may communicate a request through the cloud server 810 to the first user 840 for obtaining the first user's 840 remaining reservation ticket. If the second user 870 wants the first user's 840 reservation time at the charging station 890, the second user 870 may inquire if the first user 840 would be willing to change, modify, or transfer his reservation ticket to him. The transaction may occur between users in real time or through posted messages (e.g., email), directly or indirectly. For an indirect communication, the cloud server 810 may relay messages between the first user 840 and the second user 870 without either user having direct contact or knowledge of the other person's identity. Likewise, the cloud server 810 may use a variety of different communication methods to facilitate communication between users, including email, digital voice communication, plain old telephone service, instant messaging, push notifications, pop up messaging, an internet website, a chat room, an internet forum, short messaging service (SMS) text messaging, or any other method.

In one implementation, a reservation ticket may be assignable to different users in part or as a distinct whole. For example, if the first user 840 obtains a reservation ticket for an entire day at the charging station 890, the first user 840 may divide the reserved time into different time intervals so friends or family may charge their electric vehicles. Where a reservation ticket is divisible, the ticket may show the remaining amount of time or charge transfer allowed on the ticket. Further, the reservation ticket may also be assigned based on compensation between parties. In another implementation, if a person knows that he will not be available for charging an electric vehicle at his reserved time, he or she may return their reservation ticket to the cloud server 810 to free up a charging space for someone else. The person may be reimbursed by the cloud server 810, or they may receive a new reservation ticket for another time at the same or a different charging station.

At step 1040, the first user 840 responds through the cloud server 810 to the second user 870. Using the same or a different method of communication as used in step 940, the first user 840 may transmit a response to the request back to the second user 870. The response may be informal, where it is simply a message to the second user 870, or it may be formal where it authorizes the cloud server 810 to perform some action.

At step 1050, the first user 840 grants or denies the second user's 870 request for the remaining reservation ticket. The charging station 890 may act according to the grant or denial. For example, the cloud server 810 may transfer the reservation ticket from the first user to the second user if the request is granted.

Figure 11:
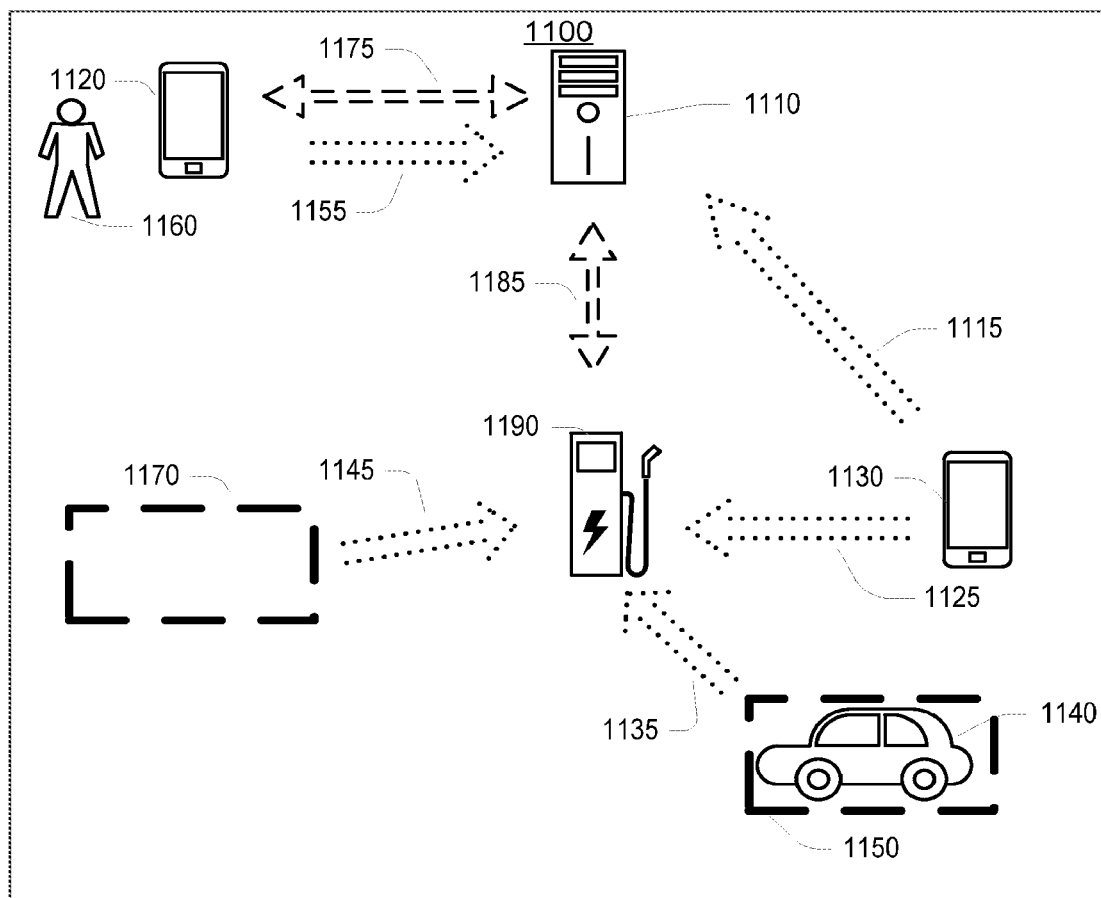
FIG. 11 illustrates an electric vehicle charging system in accordance with various techniques and technologies described herein.

Using Geolocation to Determine Availability of a Charging Station or Send Message to Mobile Device FIG. 11 illustrates an electric vehicle charging system 1100 in accordance with various techniques and technologies described herein. The charging system 1100 includes a charging station 1190 and a cloud server 1110 that monitors the geolocation of electric vehicles, mobile devices, charging spaces and other devices or things proximate to the charging station 1190 as well as over larger distances. The cloud server 1110 may use geolocation information from one or several types of geolocation methods to calculate the charging station's 1190 availability and transmit availability information to a mobile device 1120. For example, several different geolocation methods may be used simultaneously for greater accuracy or redundancy purposes. Based on the determined availability of the charging station 1190, a user 1160 may then decide whether to use this charging station 1190 or a different one.

Several geolocation methods are depicted in FIG. 11 using dotted arrows to distinguish them from network connections depicted using arrows with segmented lines. Examples of geolocation methods may include Global Position System (GPS), sonar sensors, multilateration (e.g., among cell phone towers), radio-frequency identification (RFID), induction coil sensors, any other geolocation method, or a combination of geolocation methods. In one instance, an empty charging space 1170 is monitored by a geolocation method 1145 using either nearby sensors or another geolocation method.

In one implementation, the charging station 1190 may monitor a charging space 1150 with a geolocation method 1135 to verify whether an electric vehicle 1140 has left or not. When geolocation readings from the geolocation method 1135 detect that the charging space 1150 is empty, a cloud server 1110 may broadcast to a user's 1160 mobile device 1120 over a network connection 1175 that a charging space has become available. The cloud server 1110 may also notify possible users that a charging space 1170 is currently unoccupied.

In one implementation, the charging station 1190 may also monitor the geolocation of a mobile device 1130 associated with the electric vehicle 1140 to determine the estimated time of arrival of the mobile device's 1130 user. As shown in FIG. 11, a geolocation method 1125 may be utilized at the charging station 1190 or a geolocation method 1115 by the cloud server 1110 to track the mobile device's 1130 whereabouts. More than one geolocation method may be used to monitor a device or charging space in order to improve accuracy and provide redundancy.

In another implementation, geolocation information may be transmitted to the cloud server 1110, mobile device 1130, or the charging station 1190 through a telematics platform.

Figure 12:
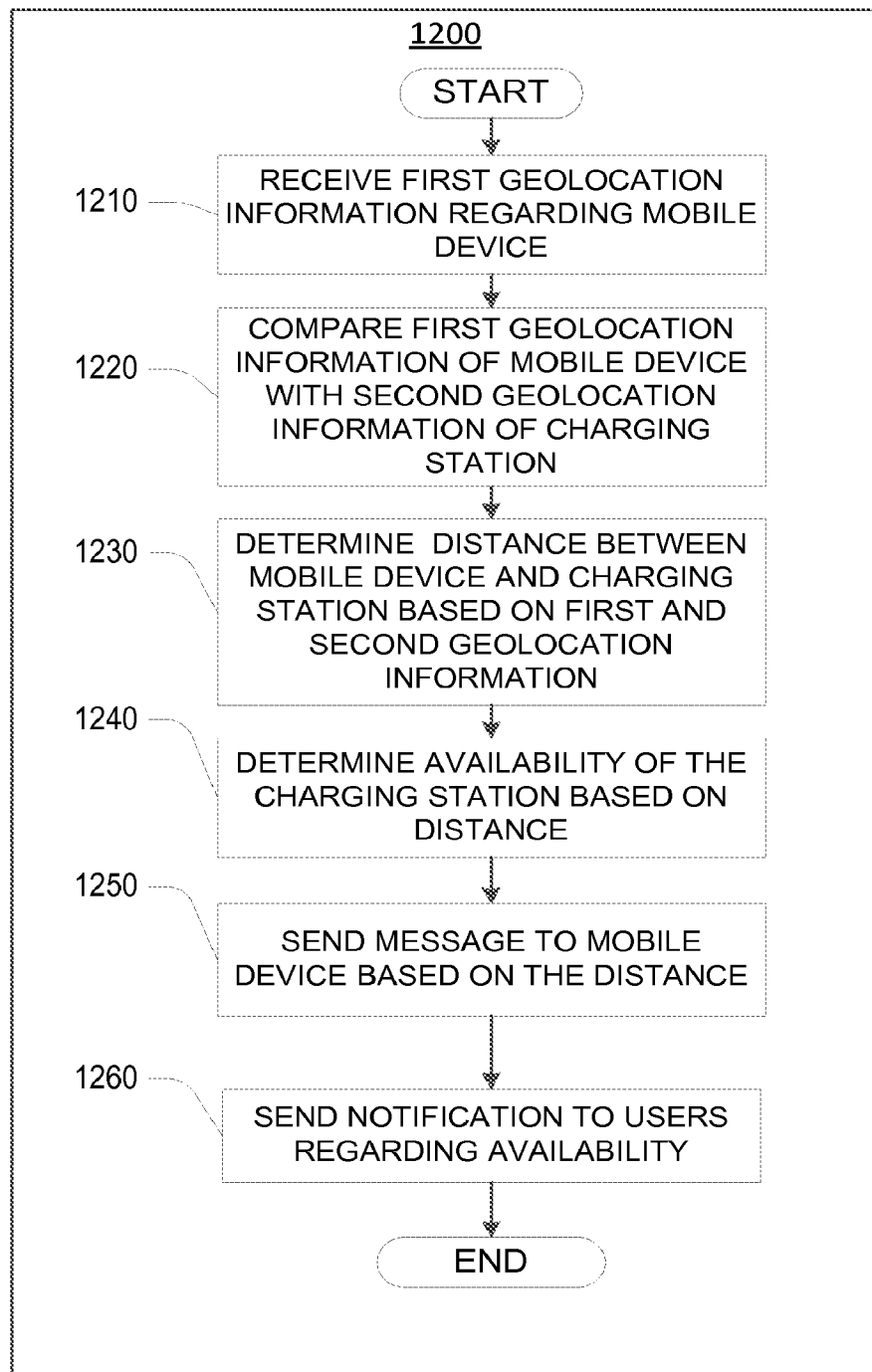
FIG. 12 illustrates a flow diagram for a method of using geolocation information to determine the availability of a charging station or sending messages to a mobile device in accordance with various techniques and technologies described herein.

FIG. 12 illustrates a flow diagram 1200 for a method of using geolocation information to determine the availability of a charging station or sending messages to a mobile device in accordance with various techniques and technologies described herein. The method in the flow diagram 1200 describes an algorithm for using geolocation information, and, therefore, may be performed by any members of the charging system 1100. It should be understood that while the operational flow diagram 1200 indicates a particular order of execution of the operations, in other implementations, the operations might be executed in a different order. Further, in some implementations, additional operations or steps may be added to the method. Likewise, some operations or steps may be omitted.

At step 1210, the charging system 1100 receives a first geolocation information regarding the mobile device 1120 from a geolocation method 1155.

As an example, the first geolocation information may be determined by forming a network connection to the mobile device 1120. When the mobile device 1120 connects to the docking station 215, the first geolocation information may be the location of the docking station 215. If the mobile device 1120 connects wirelessly to the charging station 1190, the first geolocation information may be the approximate area around the charging station 1190, where a wireless connection is possible.

Depending on the circumstances, geolocation information from one geolocation method may be optimal over geolocation information from another method. GPS or multilateration using cell phone towers is useful for locating a mobile device over a large distance. Short-range geolocation information from sonar, RFID, or induction coil sensors can alert the charging station 1190 or the cloud server 1110 whether an electric vehicle or a mobile device is entering or leaving the charging station 1190.

In one implementation, geolocation information may not necessarily be a single coordinate or reading, but a series of readings taken over seconds, minutes, hours, or even days. For example, the speed at which a mobile device is traveling, the type of terrain where a mobile device is located, metadata, or any other related data may be included in geolocation information.

At step 1220, the charging system 1100 compares the first geolocation information relating to the mobile device 1120 with a second geolocation information relating to the charging station 1190. Because the charging station 1190 is at a fixed physical location, the second geolocation information may not change and, therefore, can be stored on the cloud server 1110. For example, the charging system 1100 may use a map detailing the geolocation information of a plurality of charging stations for determining the second geolocation information. In one implementation, the second geolocation information may relate to a plurality of charging stations.

At step 1230, the charging system 1100 determines the distance between the mobile device 1120 and the charging station 1190 based on the first and second geolocation information. Further, the distance between the mobile device 1120 and a plurality of charging stations may be determined. The charging system 1100 may determine the distance between mobile devices or compare the distances between mobile devices or charging stations. Likewise, the charging system 1100 may even determine the distance between a user's mobile device and an electric vehicle owned by the same user or another user. For determining the availability of a charging station, any of these measured distances may be used in an algorithm.

In one implementation, the charging system 1100 may use a third geolocation information, where the information is in regard to a geographical feature. Geographical features may include roads, cities, radio or cell towers, a physical landmark, such as a forest or mountain, or a commercial establishment, such as hotels or restaurants. The cloud server 1110 may develop a navigation route between the mobile device 1120 and the charging station 1190, or a plurality of charging stations using the third geolocation information. The navigation route may also be based on the traveling speed of the mobile device 1120.

At step 1240, the charging system 1100 determines the availability of the charging station 1190 based on the distance between the mobile device 1120 and the charging station 1190. Availability may refer to the current availability of charging spaces or charge transfer at the charging station 1190. In one implementation, availability may refer to a future expected availability of charging spaces or charge transfer at the charging station 1190.

Availability may be determined through several different availability algorithms. The simplest method is to determine whether all current charging spaces are occupied or reserved. In one implementation, the charging system 1100 may calculate the expected number of charging spaces that are usually occupied at a given time on a specific day of the week and use this data accordingly. By knowing how far the mobile device 1120 is from the charging station 1190, the cloud server 1110 may provide an accurate predictor of the future arrival time when the mobile device's 1120 user 1160 may collect their electric vehicle 1140.

Availability may be gauged in terms of actual availability or as a probability or likelihood that a charging space may be available upon a user's arrival at the charging station 1190. This probability or likelihood may be defined as an availability score. The availability score may take into account how many charging spaces or charge transfer remains at a charging station. Likewise, charging stations may update the cloud server 1110 continuously on the availability of charging spaces, or when a connection to the cloud server 1110 becomes available. For determining availability as a probability, the availability algorithm may consider how much time has passed since the last update.

At step 1250, the charging system 1100 sends a message to the mobile device 1120 based on the distance between the mobile device 1120 and the charging station 1190. The mobile device 1120 may receive the message over the network connection 1175 to the cloud server 1110. The message may be based on the availability of the charging station 1190, an electric vehicle charging transaction, the mobile device's 1120 distance from the charging station 1190, whether the mobile device 1120 is approaching or leaving the charging station 1190, or any other relevant message. For example, if the mobile device 1120 is leaving the charging station 1190, the charging system 1100 may send the mobile device 1120 a goodbye message, a receipt of the charging transaction, a notification asking the mobile device 1120 to confirm whether the electric vehicle 1140 is finished charging, or any other relevant message. Likewise, if a mobile device 1120 is approaching the charging station 1190, the charging system 1100 may send the mobile device 1120 updates on the charge transfer of their electric vehicle, a welcome message, a request to reserve a charging space, or any other relevant message. In one implementation, the messages relating to mobile devices approaching or leaving a charging station may be based on specific distances from a charging station rather than the arrival or departure of a mobile device.

At step 1260, the charging system 1100 sends a notification to users regarding the availability of the charging station 1190 or several charging stations. Further, the notification may include the expected amount of time that a charging station may be available, the amount of time when a charging station may become available, how accurate is the information, and how many available slots may be at a charging station. A charging station slot may be a time slot or a vehicle slot, such as a charging space.

Figure 13:
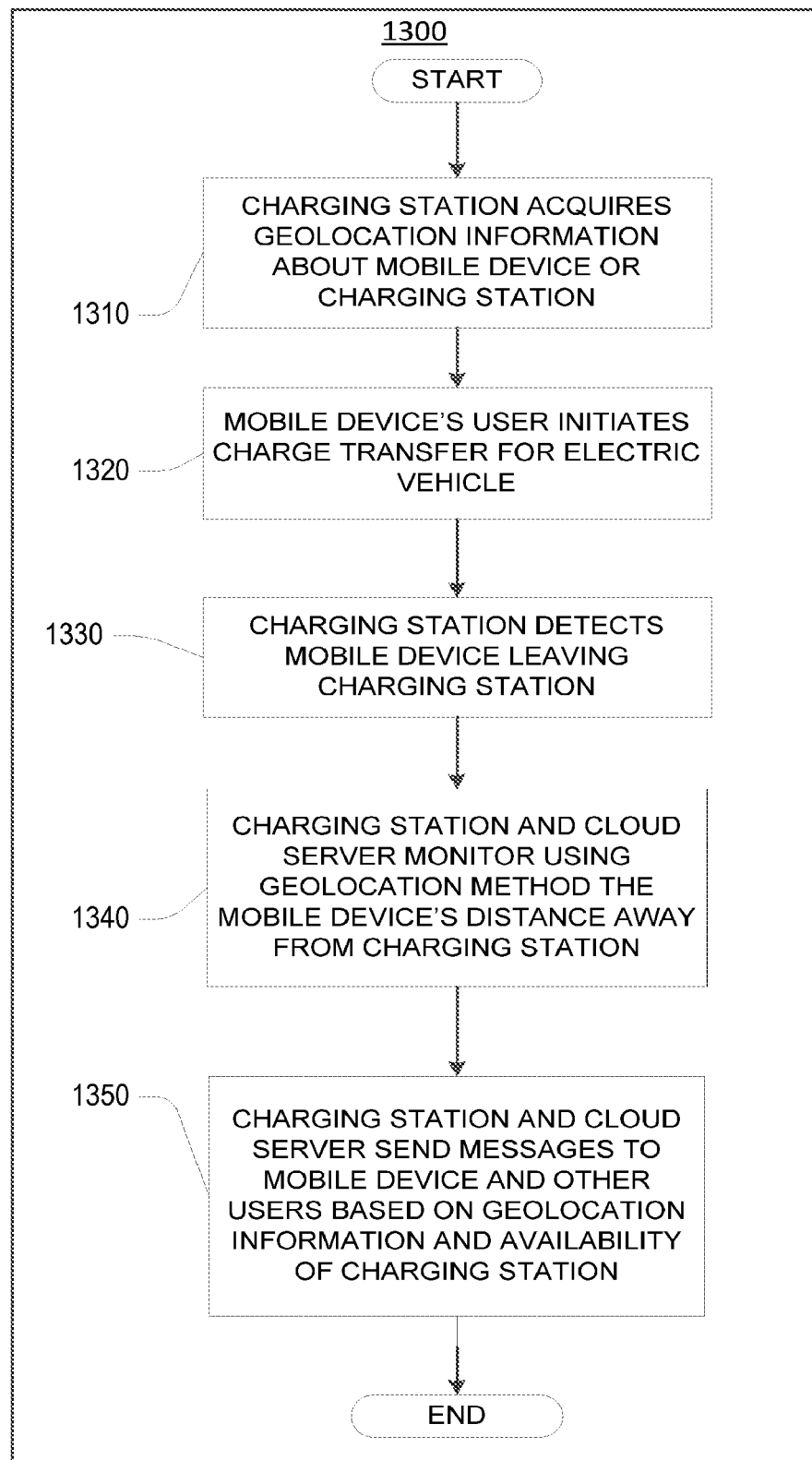
FIG. 13 illustrates a flow diagram for a method of using geolocation methods to monitor mobile devices at and away from a charging station in accordance with various techniques and technologies described herein.

FIG. 13 illustrates a flow diagram 1300 for a method of using geolocation methods to monitor mobile devices at and away from a charging station in accordance with various techniques and technologies described herein. In one implementation, the method described in the flow diagram 1100 is performed by the cloud server 1110 and the charging station 1190. It should be understood that while the operational flow diagram 1100 indicates a particular order of execution of the operations, in other implementations, the operations might be executed in a different order. Further, in some implementations, additional operations or steps may be added to the method. Likewise, some operations or steps may be omitted.

At step 1310, the charging station 1190 acquires geolocation information about the mobile device 1120 or the charging station 1190 using geolocation method 1155. For a detailed explanation about geolocation information, see steps 1210 and 1220 in FIG. 12. When the mobile device 1120 arrives at the charging station 1190, several geolocation methods may be triggered or initiated by the charging system 1100. In one geolocation method 1135, the charging station 1190 may have sensors stationed around charging spaces to determine whether or not an electric vehicle occupies a charging space or enters the area around the charging station 1190. For example, geolocation method 1135 may use sonar, induction coil sensors, RFID, or another method to register the arrival, departure, or continued presence of an electric vehicle at the charging station 1190. If the charging station 1190 uses geolocation method 1145 on an empty charging space 1170, the charging station 1190 may report to the cloud server 1110 that the charging space 1170 is available for a new electric vehicle. If an electric vehicle 1140 connects to the charging station 1190 via a charging coupler 665 and begins charging the vehicle's battery, then the charging station 1190 determines using geolocation method 1145 that the electric vehicle 647 occupies the charging space 1140.

At step 1320, the user 1160 of the mobile device 1120 initiates a charge transfer for the electric vehicle 1140 at the charging station 1190. If the electric vehicle 1140 connects to the charging station 1190 via a charging coupler 665 and begins charging the vehicle's battery, then the charging station 1190 may determine that the electric vehicle 647 occupies the charging space 1140. This information may be used as a geolocation method.

At step 1330, the charging station 1190 detects the mobile device 1120 leaving the charging station 1190 using a geolocation method 1155.

At step 1340, the charging station 1190 and the cloud server 1110 monitor the mobile device's 1120 distance away from the charging station 1190 using geolocation methods. By knowing how far away the mobile device 1120 is from the charging station 1190, the charging system 1100 may predict whether the mobile device's 1120 user 1160 is occupied or returning to the charging station 1190. In one implementation, the cloud server 1110 may monitor the speed and distance of the mobile device 1120 in order to predict the estimated time of arrival of the user 1160. If the measured speed is faster than a typical human's walking speed for a specific time duration or specific travel pattern, the charging system 1100 may use this information to predict whether the user is returning to the charging station 1190.

In one implementation, where the mobile device 1120 is a cell phone or similar device, the cloud server 1110 or the charging station 1190 may communicate over the network connection 1175 with the mobile device 1120 about the user's 1160 estimated time of arrival. The cloud server 1110 may send inquiries asking when the user 1160 expects to collect their vehicle. The charging system 1100 may use this response for calculating availability for other users. To send messages over the network connection 1185 from the charging station 1190 to a mobile device away from the charging station 1190, the piggybacked approach described with reference to FIGS. 6-7 may be employed.

At step 1350, the charging station 1190 and cloud server 1110 may send messages to the mobile device 1120 or other users based on the acquired geolocation information and the availability of the charging station 1190. These messages may be similar to the messages sent above in step 1060 with respect to FIG. 10.

Using a Mobile Device as a Means for Controlling Charge Transfer

Figure 14:
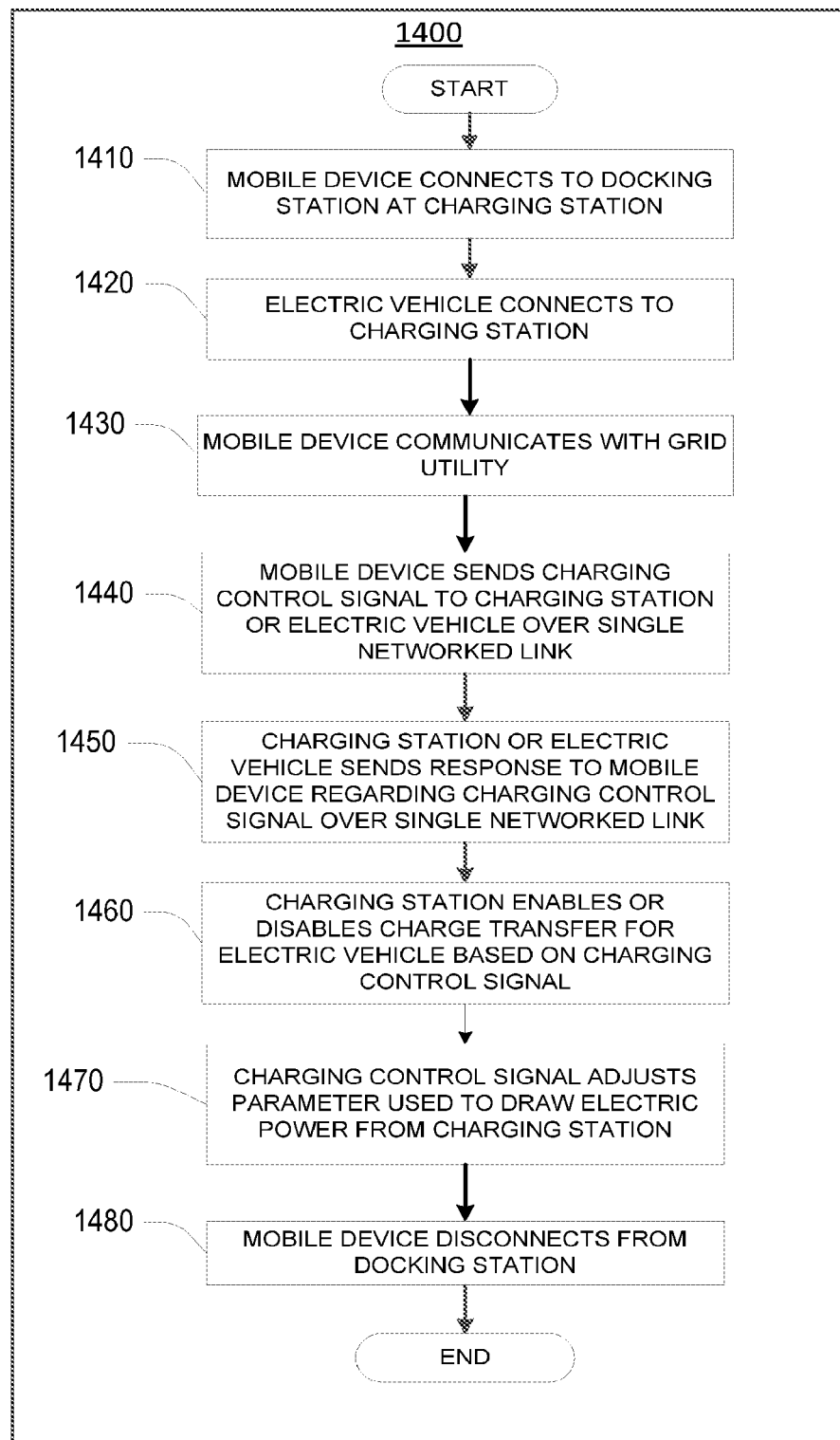
FIG. 14 illustrates a flow diagram for a method for using a mobile device as a means for controlling charge transfer in accordance with various techniques and technologies described herein.

FIG. 14 illustrates a flow diagram for a method 1400 for using a mobile device 140 as a means for controlling charge transfer in accordance with various techniques and technologies described herein. In one implementation, the method in the flow diagram 1400 may be performed by a mobile device 140. Method 1400 is described with reference to FIGS. 1-2 and various components illustrated therein. It should be understood that while the operational flow diagram 1400 indicates a particular order of execution of the operations, in other implementations, the operations might be executed in a different order. Further, in some implementations, additional operations or steps may be added to the method. Likewise, some operations or steps may be omitted.

A mobile device 140 may have a mobile application that contains software for communicating with the control pilot 225 at the charging station 190. At step 1410, the mobile device 140 connects to the docking station 215. The mobile device 140 may connect over an audio jack, a universal service bus (USB) cable or the charging coupler. At step 1420, the electric vehicle connects to the charging station 1190. At step 140, the mobile device 140 communicates with a grid utility.

At step 1440, the mobile device 140 sends a charging control signal to the charging station 190 or the electric vehicle 130 over a single networked link 170. The single networked link 170 may be the connection to the docking station 215. For example, the mobile device 140 may communicate wirelessly to the charging station 190 or the electric vehicle 130.

Charging control signals may include instructions for regulating or initiating a standard charge transfer from the side of the electric vehicle 130 or the charging station 190. Likewise, the charging control signal may include charging parameters, updates for the electric vehicle 130 or charging station 190, or smart charging instructions relating to a charge transfer. In some implementations, the mobile device 140 may send the charging control signal directly to the control pilot 225 or to a receiver on the electric vehicle 130 or the charging station 190.

At step 1450, the charging station 190 or the electric vehicle 130 sends a response to the mobile device 140 regarding the charging control signal over the single networked link 170. The response may include a message that the charging control signal was received, that no error occurred in following the charging control signal, or another relevant response back to the mobile device 140. At step 1460, the charging station 190 enables or disables charge transfer for the electric vehicle 130 based on the charging control signal. At step 1470, the charging control signal adjusts a parameter used to draw electric power from the charging station 190. At step 1480, the mobile device 140 disconnects from the docking station 215.

Figure 15:
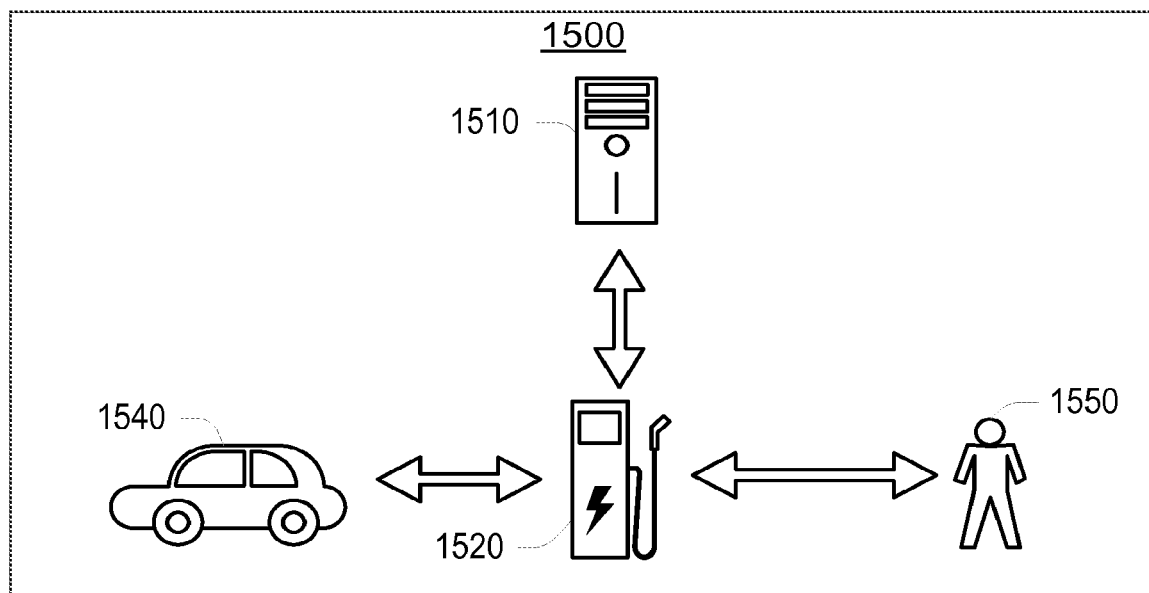
FIG. 15 illustrates an electric vehicle charging system in accordance with various techniques and technologies described herein.

Regulating the Charging of an Electric Vehicle Through Adjusting the Charging Current's Duty Cycle or Other Charging Parameters FIG. 15 illustrates an electric vehicle charging system 1500 in accordance with various techniques and technologies described herein. The charging system 1500 may serve a residential home, a building or commercial entity. The electric vehicle charging system 1500 is described with reference to various components of FIG. 2.

The electric vehicle charging system 1500 includes a charging station 1520 connected to a server 1510. The server 1510 may be a remote server, such as a cloud server, a server for a local metering network, a control pilot module part of or external to the charging station 1520, or any other device capable of sending instructions to the charging station 1520. The charging station 1520 may communicate with the server 1510 over a power line communication (PLC) network, through an Internet connection in the home or business, or any other network means. FIG. 15 further illustrates an electric vehicle 1540 that may be charged using the charging station 1520 through a charging coupler 265. A charging current may pass through the charging coupler to the electric vehicle 1540 to charge a battery or energy storage unit, but the electric vehicle 1540 or the charging station 1520 may also send a communication signal to the other device through the charging coupler 265. Likewise, a user 1550 can initiate a charge transfer for the electric vehicle 1540 through the user interface 205 on the charging station 1520, with a mobile device (not shown), such as a cell phone, or another method.

Figure 16:
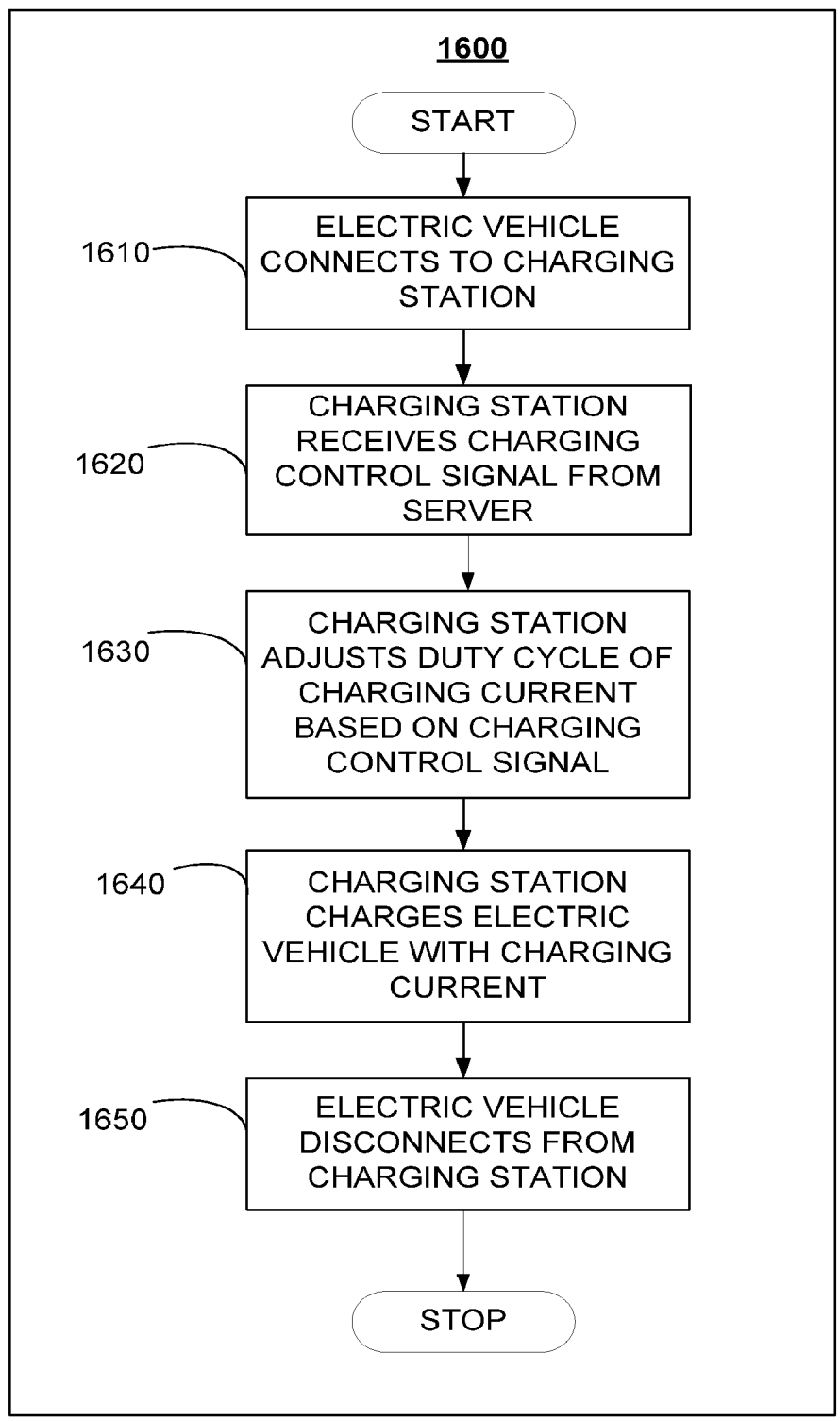
FIG. 16 illustrates a flow diagram for a method for regulating the charging of an electric vehicle through adjusting a charging current's duty cycle in accordance with various techniques and technologies described herein.

FIG. 16 illustrates a flow diagram 1600 for a method for regulating the charging of an electric vehicle through adjusting a charging current's duty cycle in accordance with various techniques and technologies described herein. In one implementation, the method in the flow diagram 1600 is performed by a charging station. It should be understood that while the operational flow diagram 1600 indicates a particular order of execution of the operations, in other implementations, the operations might be executed in a different order. Further, in some implementations, additional operations or steps may be added to the method. Likewise, some operations or steps may be omitted.

At step 1610, the electric vehicle 1540 connects to the charging station 1520 through the charging coupler 265 or another method, such as a wireless or another wired connection.

At step 1620, the charging station 1520 receives a charging control signal from the server 1510. In one implementation, the server 1510 may communicate with a grid utility or a smart charger on a remote or local server for determining the charging control signal. Conversely, the charging control signal may arise locally at the charging station, as from the onboard control pilot 225. The charging control signal may be based on one or several charging parameters, including a battery temperature of an electric vehicle, a charging current, a battery charge of an electric vehicle, a length of time since an electric vehicle began charging, a price of electricity, a time of day, a time until an electric vehicle's next use, a weather reading, an option for econo-charging, a charging cable rating, a circuit protection rating, a current duty cycle for a charging current for one or several electric vehicles, a future power draw from an electric vehicle, a threshold level for aggregate electric consumption, a threshold level for instantaneous electrical consumption, a maximum allowable charge rate, a microgrid rating, a present power draw from an electric vehicle, a protection fuse rating, a quantity of electricity stored within a microgrid, an operational limit set by a grid utility, an option for using green energy, and any other relevant charging information.

At step 1630, the charging station 1520 adjusts the duty cycle of a charging current based on the charging control signal. In one implementation, the duty cycle may be a pulse width modulated (PWM) signal. See FIG. 17 for examples of different charging current duty cycles. By controlling the duty cycle, the charging rate can be varied to achieve a desired power output.

In some implementations, the electric vehicle's 1540 charging current may use a static duty cycle, an adjusted duty cycle, or a variable duty cycle. A static duty cycle may be a default duty cycle used by the charging station 1520, or a different duty cycle manually chosen by the user 1550 or server 1510. An adjusted duty cycle is a duty cycle modified by the server 1510 or the charging station 1520 based on some predetermined condition or conditions. A charging control signal may include these predetermined conditions, or be the result or product of following these predetermined conditions. The process of verifying whether the condition is satisfied or unsatisfied may occur at the electric vehicle 1540, the charging station 1520, or the server 1510.

A variable duty cycle is a duty cycle that may change to a plurality of different duty cycle values throughout an electric vehicle's charge transfer. For example, a variable duty cycle is similar to an adjusted duty cycle in that a variable duty cycle uses predetermined conditions, except that a variable duty cycle may represent two or more duty cycle values, while an adjusted duty cycle may be one modified duty cycle. Likewise, once a variable duty cycle is implemented at the charging station 1520, no external instructions or charging control signals may be required to change duty cycle values throughout a charge transfer.

Predetermined conditions may correspond to charging parameters, an external command from the server 1510, or a charging rate algorithm. For example, a charging rate algorithm may include a relationship where a specified percentage increase in electricity prices results in a specified percentage decrease in the duty cycle of the charging current. In one implementation, the charging rate algorithm may be based on communications within a "multi-agent system." A multi-agent system includes a mesh network of charging stations or other charging agents that use logic to communicate, self-regulate, and optimize the local load on a microgrid.

A duty cycle may be selected in several ways. For example, in a standalone mode, the charging station 1520 or the server 1510 can select a duty cycle that is the lower of the maximum current rating of the charging cable and the maximum current rating of a protection/fuse installed. This will ensure that the charging current is within constraints of the safe operating range of the charging station 1520. Likewise, a macrogrid or microgrid operator may be able to communicate with the charging station and adjust the charging current according to the available line current for the grid.

A duty cycle may be determined by the control pilot 225 and dynamically varied in accordance with pre-specified charging algorithms or optimization parameters, or may be automatically selected from default settings within the constraints of an electric vehicle's safe operating range. In some implementations, the duty cycle may correspond to a variable charging rate, such as a charging rate corresponding to a smart charging algorithm.

At step 1640, the charging station 1520 charges the electric vehicle 1540 with the charging current that reflects a selected duty cycle. The electric vehicle's 1540 battery or energy storage unit will be charged through a charging current sent over the charging coupler 265 coupled to the electric vehicle 1540.

In one implementation, the charge transfer initiated by step 1640 may not be a continuous charge. The charging station 1520 may stagger the charging rate or charging period depending on whether an option for smart charging is selected, the length of time the electric vehicle is expected to charge, the time until the electric vehicle's next use, the specific time for completing the charging of an electric vehicle, how many other electric vehicles are being charged, the current battery temperature of an electric vehicle, or other factors or parameters.

Further, at step 1640, the act of enabling or disabling charging of the electric vehicle 1540 may occur via the control pilot 225. Charging may proceed according to standard SAE J1772. For example, the method for controlling the dispensing of charge from the charging station 1520 is through activating or deactivating the control pilot 225. In another instance, the control pilot 225 may decide the battery in the electric vehicle is fully charged, or based on another condition, and end the charge transfer. Likewise, the control pilot 225 may receive a charging control signal from a mobile device or an instruction from the cloud server 1510 to stop charging the electric vehicle 1540. The user 1550 may stop the charge transfer by unplugging a charging coupler from the electric vehicle 1540.

In another implementation, the control pilot 225 may gradually reduce the charging current's duty cycle automatically within a preset timeframe. The duty cycle may decrease until it is within an allowable charging rate.

At step 1650, the electric vehicle 1540 disconnects from the charging station 1520.

Figure 17:
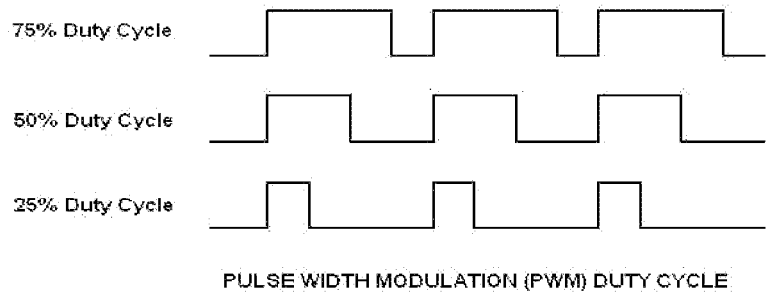
FIG. 17 illustrates different pulse width modulation (PWM) duty cycles in accordance with various techniques and technologies described herein.

FIG. 17 illustrates different pulse width modulation (PWM) duty cycles in accordance with various techniques and technologies described herein. A charging current with a 25% duty cycle would require the most time to charge an electric vehicle's battery, while a charging current with a 75% duty cycle would charge an electric vehicle the fastest. In step 1630, the charging control signal may select one of the three duty cycles shown in FIG. 17 or a different one depending on the charging parameters, the currently used algorithm, commands from the server 1510, or another reason.

Figure 18:
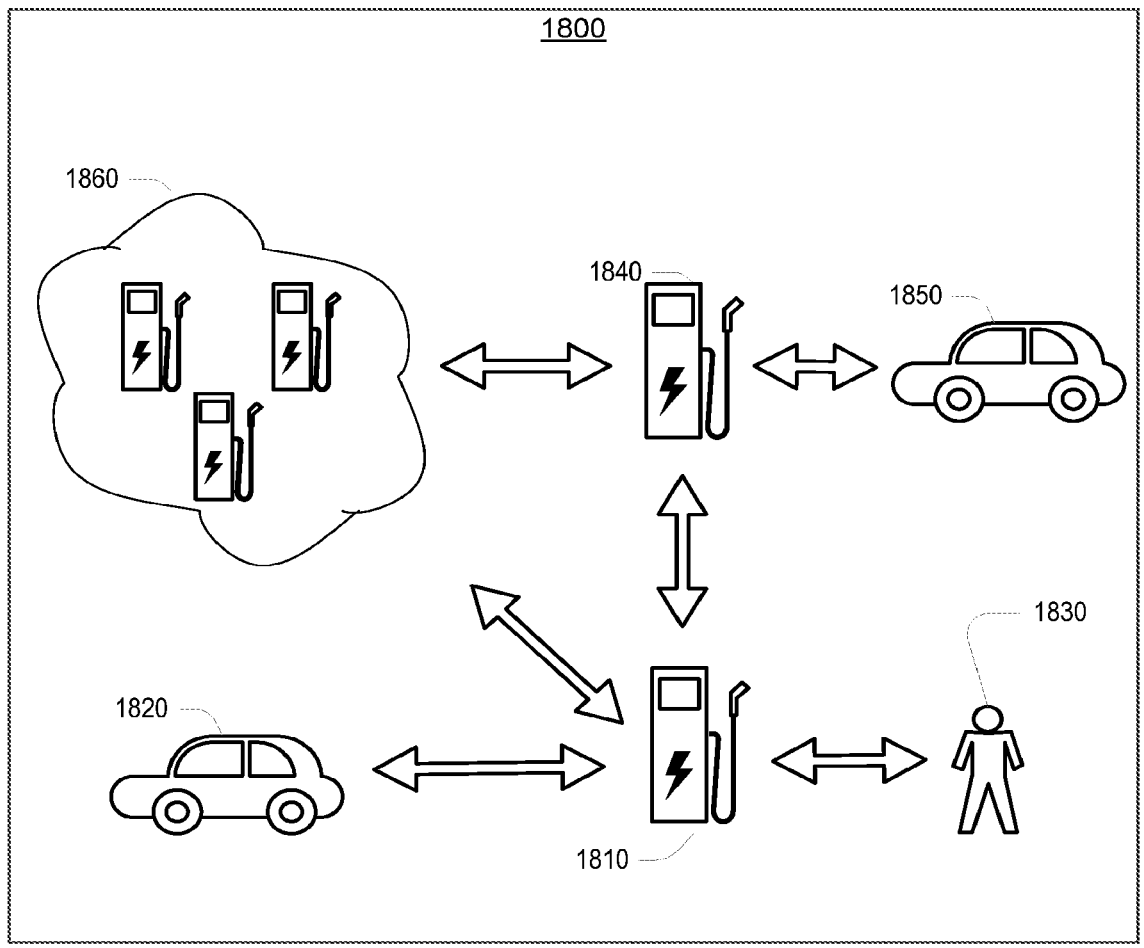
FIG. 18 illustrates an electric vehicle charging system in accordance with various techniques and technologies described herein.

Managing the Charging of Electric Vehicles within an Electrical Grid Through a Multi-Agent Network FIG. 18 illustrates an electric vehicle charging system 1800 in accordance with various techniques and technologies described herein. The electric vehicle charging system 1800 includes a first electric vehicle charging station 1810 in communication with a second electric vehicle charging station 1840. For purposes of this charging system 1800, any referenced charging station may represent the entire charging infrastructure at a physical location, including charging spaces, charging slots and all other equipment relating to charging electric vehicles. However, any referenced charging station may also represent individual charging slots or any amount of equipment less than the whole charging infrastructure for charging a single or several electric vehicles at the physical location. Each of the first electric vehicle charging station 1810 and the second electric vehicle charging station 1840 is also in communication with a network (or mesh or cloud) 1860 of electric vehicle charging stations. The communication may be facilitated across a local area network, a local metering network, an electrical power grid, a wide area network, or some other network infrastructure. FIG. 18 further illustrates a first electric vehicle 1820 that may be charged using the first electric vehicle charging station 1810 and a second electric vehicle 1850 that may be charged using the second charging station 1840. The two charging stations may communicate with each other or with the network of charging stations 1860 to manage charge transfer for all the electric vehicles.

This approach in the charging system 1800 to having charging stations communicate with other individual charging stations, or as a member of the network of charging stations 1860, describes an example of a multi-agent network. In a multi-agent network, each charging station may act as an intelligent agent with the circuitry and logic necessary for communicating with other intelligent agents. For any network charging algorithms, each intelligent agent may be equal to other agents inside the network, or be weighted with greater or lesser priority or importance in relation to the other intelligent agents.

Some charging stations within the multi-agent network may be "dumb" and take part in no network charging algorithms or network communication. In one implementation, a "dumb" charging station may be converted to an intelligent agent through an intelligent adaptor or module that may be coupled to the "dumb" charging station. The intelligent adaptor may be coupled to a standard electrical outlet.

Figure 19:
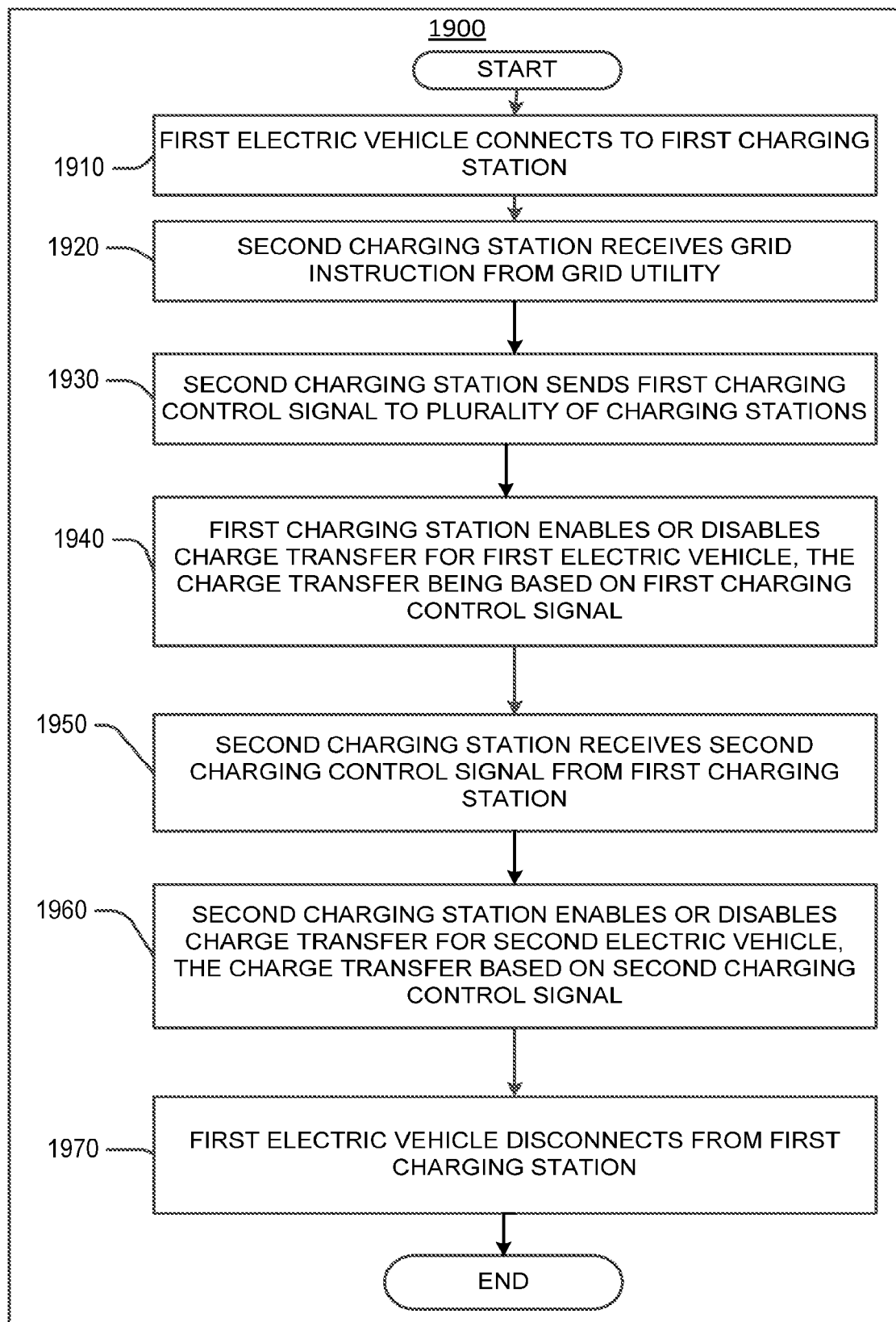
FIG. 19 illustrates a flow diagram of a method for managing the charging of an electric vehicle by communicating charging control signals amongst a plurality of charging stations in a multi-agent network in accordance with various techniques and technologies described herein.

FIG. 19 illustrates a flow diagram 1900 of a method for managing the charging of an electric vehicle by communicating charging control signals amongst a plurality of charging stations in a multi-agent network in accordance with various techniques and technologies described herein. In one implementation, the method described in the flow diagram 1900 may be performed by a charging station. It should be understood that while the operational flow diagram 1900 indicates a particular order of execution of the operations, in other implementations, the operations might be executed in a different order. Further, in some implementations, additional operations or steps may be added to the method. Likewise, some operations or steps may be omitted.

At step 1910, the first electric vehicle 1820 is connected to the first charging station 1810. For example, the first electric vehicle 1820 may connect through a charging coupler as used for charging the battery on an electric vehicle. Likewise, the first electric vehicle 1820 may connect through a wireless or another wired method, or a combination thereof. Further, after making a connection, the first charging station 1810 may transmit charging information regarding the first electric vehicle 1820 and the subsequent charge transfer throughout the network 1860 of charging stations. In response, charging stations in the network 1860 may adjust various electrical loads to address this new charge transfer.

At step 1920, the second charging station 1840 receives a grid instruction from a grid utility. The grid utility is responsible for determining the maximum allowable line current, and, therefore, the maximum allowable charging rate for a charging station, a microgrid, or a macrogrid.

A microgrid may refer to any predefined sub-portion of an electrical grid, other than the entire macrogrid. A microgrid may be a level of a building, an entire building, a shopping center, a college campus, a neighborhood, a collection of buildings, or any other predetermined electrical infrastructure. A microgrid may encompass only electric vehicles, or it may include nonvehicle loads, such as household appliances, for example. A macrogrid is a collection of microgrids.

The grid utility may communicate with charging stations over a wired connection, such as over a power line communication (PLC) network, the Zigbee protocol, any number of wireless or wired network methods, or combinations thereof.

The grid instruction may contain permissive or mandatory guidelines for charging electric vehicles across a microgrid, a macrogrid, or individual charging stations. Further, the instruction may be used to create commands for other charging stations, or relayed across the network 1860 to specific charging stations or intelligent agents. A grid instruction may pertain to one charging station or several charging stations.

Further, the grid instruction may include charging information, such as charging parameters, smart charging operations, commands for managing electric vehicle charge transfers along a microgrid or macrogrid, or other information. As part of or in addition to the grid instruction, the grid utility may send a request to update the grid utility with charging information relating to one or several charging stations.

At step 1930, the second charging station 1840 sends a first charging control signal to a plurality of charging stations. The plurality of charging stations may include the network 1860 of charging stations and the first charging station 1810. A charging control signal may include charging parameters, updates for ongoing or past charge transfers at any charging station, commands to increase or decrease the amount of current or power being drawn from the electrical grid, other commands, guidelines for charging any or a specific electric vehicle or vehicles at any or a specific charging station or stations, or other charging information. Furthermore, the charging control signal may be used to control locks, motions sensors, alarms, and meter readings.

In one implementation, the charging control signals may include commands or data relating to a negotiation algorithm for determining electric vehicle charging rates for charging stations in the network 1860. In the negotiation algorithm, charging stations transmit charging control signals between each other to determine the optimal charging rates for some or all electric vehicles being charged. The negotiation algorithm may consider factors, such as priority lists, pricing, urgency, safety, etc. In some algorithms, each charging station may receive the same charge allocation as the other charging stations, or a specific one for the charging station. At each charging station using the negotiation algorithm, each electric vehicle may receive the same charging rate, or one specific to the electric vehicle. The factors used by the negotiation algorithm may be updated in real-time, at periodic intervals, or upon command of one or more of the charging stations in the network 1860.

In another implementation, charging stations in the network 1860 may be participatory or non-participatory agents. A participating agent is considered among the network's 1860 algorithms for determining charging current parameters among other participating agents. A non-participatory agent may have its line current set to a static value, where the value is determined locally at the non-participatory agent, by a remote server, or by another method. If only one participating agent is present, that charging station will dictate the initial charging rate, charging parameters and other charging conditions for future participatory agents.

The first charging station 1810 may or may not be an intelligent agent. If the first charging station 1810 is an intelligent agent, it may accept the charging control signal, or transmit a response to the second charging station 1840 rebutting the charging control signal. As an intelligent agent, the first charging station 1810 may override the charging control signal, transmit new charging parameters back to the second charging station 1840 for use in an updated negotiation algorithm, or send its own charging control signal. If the first charging station is a "dumb" station, it will passively accept the charging control signal and follow any charging commands or instructions accordingly. Likewise, a "dumb" station may send a response that the charging control signal has been successfully implemented.

At step 1940, the first charging station 1810 enables or disables a charge transfer for the first electric vehicle 1820, where the charge transfer is based on the first charging control signal. The first charging station 1810 may store charging algorithms for managing the charge transfer in its control pilot 225, its computing system 242, or another component. These charging algorithms may utilize the charging parameters from the first charging control signal, commands, or guidelines. In other implementations, the algorithms may be performed at another charging station, a cloud server or even a mobile device or electric vehicle. In one implementation, these charging algorithms may be based on a plurality of charging control signals received from the network 1860 or any other agent in the network, whether a charging station or not. Some, all, or none of these charging control signals may be included in the charging algorithms for regulating charge transfers.

At step 1950, the second charging station 1840 receives a second charging control signal from the first charging station 1810. In a multi-agent network, agents may send out new charging controls signals to other agents, or in response to a charging control signal. Two or more charging stations may determine their charging transfers in relation to each other, without communicating with the network 1860, or may broadcast and receive charging control signals with the network 1860. In one implementation, a plurality of charging stations may synchronize charging parameters among the plurality. During the charging process, the first charging station 1810 may update or modify its charging current or other charging parameters based on newly received charging control signals. A relevant charging algorithm may be recalculated based on new charging parameters or instructions from another agent in the network.

At step 1960, the second charging station 1840 enables or disables charge transfer for the second electric vehicle 1850, where the charge transfer is based on the second charging control signal.

At step 1970, the first electric vehicle 1820 disconnects from the first charging station 1810. Any algorithms used by the network 1860 or other charging stations may be reset at this point to take into account one fewer load on the charging system 1800. Likewise, the first charging station 1810 may broadcast an update to the network 1860 that a load has been disconnected. This update may be sent immediately, or at a determined time.

Computer System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 20:
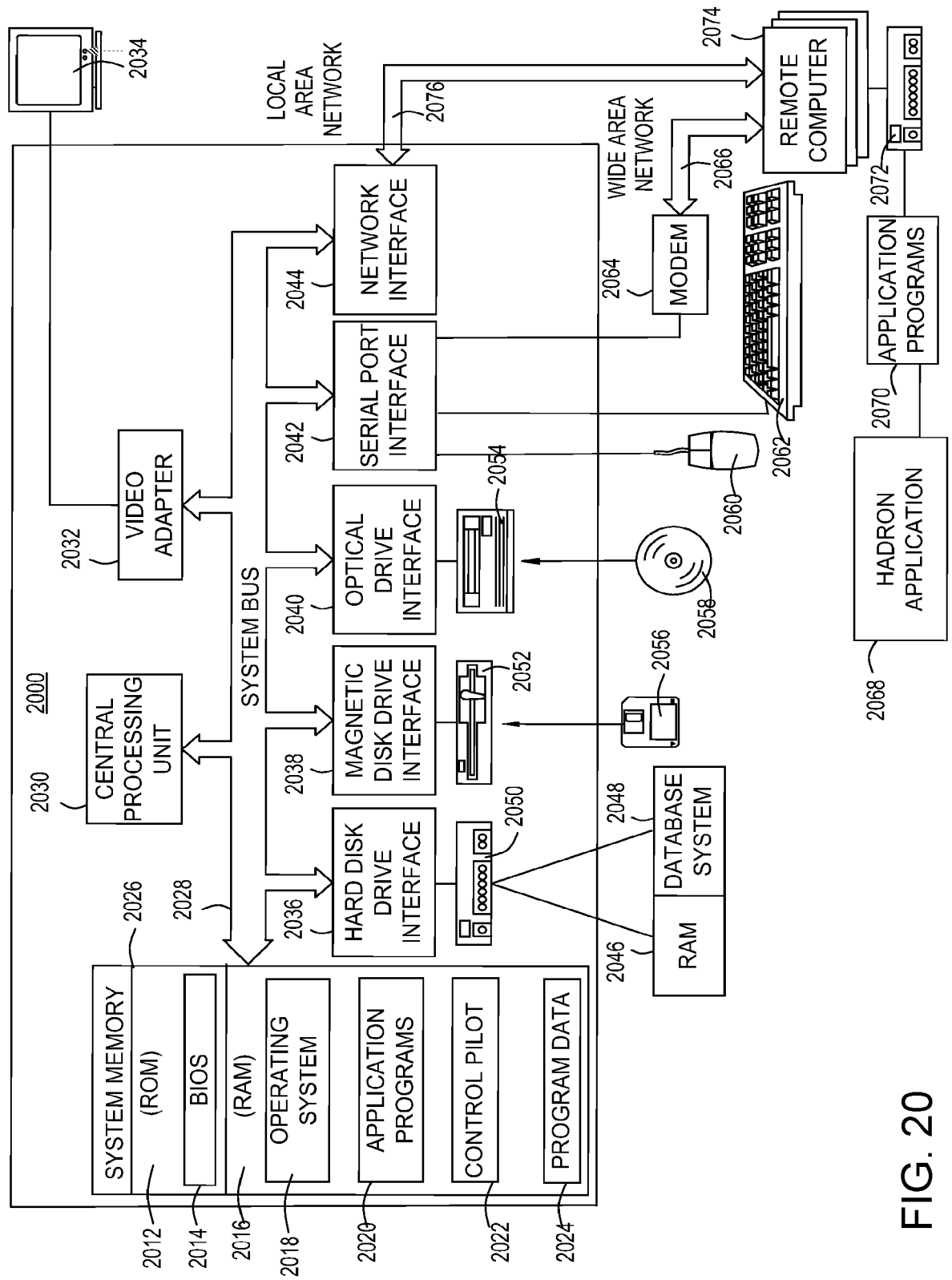
FIG. 20 illustrates a schematic diagram of a computing system in which the various technologies described herein may be incorporated and practiced.

FIG. 20 illustrates a schematic diagram of a computing system 2000 in which the various technologies described herein may be incorporated and practiced. Although the computing system 2000 may be a conventional desktop or a server computer, as described above, other computer system configurations may be used.

The computing system 2000 may include a central processing unit (CPU) 2030, a system memory 2026 and a system bus 2028 that couples various system components including the system memory 2026 to the CPU 2030. Although only one CPU is illustrated in FIG. 20, it should be understood that in some implementations the computing system 2000 may include more than one CPU. The system bus 2028 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 2026 may include a read only memory (ROM) 2012 and a random access memory (RAM) 2046. A basic input/output system (BIOS) 2014, containing the basic routines that help transfer information between elements within the computing system 2000, such as during start-up, may be stored in the ROM 2020.

The computing system 2000 may further include a hard disk drive 2050 for reading from and writing to a hard disk, a magnetic disk drive 2052 for reading from and writing to a removable magnetic disk 2056, and an optical disk drive 2054 for reading from and writing to a removable optical disk 2058, such as a CD ROM or other optical media. The hard disk drive 2050, the magnetic disk drive 2052, and the optical disk drive 2054 may be connected to the system bus 2028 by a hard disk drive interface 2036, a magnetic disk drive interface 2038, and an optical drive interface 2040, respectively. The drives and their associated computer-readable media may provide nonvolatile storage of computer-readable instructions, data structures, program modules and other data for the computing system 2000.

Although the computing system 2000 is described herein as having a hard disk, a removable magnetic disk 2056 and a removable optical disk 2058, it should be appreciated by those skilled in the art that the computing system 2000 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 2000. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk 2050, magnetic disk 2056, optical disk 2058, ROM 2012 or RAM 2016, including an operating system 2018, one or more application programs 2020, control pilot 2022, program data 2024, and a database system 2048. The application programs 2020 may include various mobile applications ("apps") and other applications configured to perform various methods and techniques described herein. The operating system 2018 may be any suitable operating system that may control the operation of a networked personal or server computer, such as Windows® XP, Mac OS® X, Unix-variants (e.g., Linux® and BSD®), and the like.

A user may enter commands and information into the computing system 2000 through input devices such as a keyboard 2062 and pointing device 2060. Other input devices may include a microphone, joystick, game pad, satellite dish, scanner, or the like. These and other input devices may be connected to the CPU 2030 through a serial port interface 2042 coupled to system bus 2028, but may be connected by other interfaces, such as a parallel port, game port or a universal serial bus (USB). A monitor 2034 or other type of display device may also be connected to system bus 2028 via an interface, such as a video adapter 2032. In addition to the monitor 2034, the computing system 2000 may further include other peripheral output devices such as speakers and printers.

Further, the computing system 2000 may operate in a networked environment using logical connections to one or more remote computers 2074. The logical connections may be any connection that is commonplace in offices, enterprise-wide computer networks, intranets, and the Internet, such as local area network (LAN) 2076 and a wide area network (WAN) 2066. The remote computers 2074 may each include application programs 2020 similar to that of the computer action function.

When using a LAN networking environment, the computing system 2000 may be connected to the local network 2076 through a network interface or adapter 2044. When used in a WAN networking environment, the computing system 2000 may include a modem 2064, wireless router or other means for establishing communication over a wide area network 2066, such as the Internet. The modem 2064, which may be internal or external, may be connected to the system bus 2028 via the serial port interface 2042. In a networked environment, program modules depicted relative to the computing system 2000, or portions thereof, may be stored in a remote memory storage device 2072. It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for controlling a charging of multiple electric vehicles in a local area network of vehicle charging stations, the local area network including a first electric vehicle charging station and a second electric vehicle charging station, the system comprising:
   an application disposed in a memory device of the first electric vehicle charging station and storing instructions thereon that when executed by one or more processors on the first electric vehicle charging station, causes the one or more processors to send communications from the electric vehicle charging station to a cloud server using the local area network, wherein a mobile device relays a charge transfer request from the first electric vehicle charging station to the cloud server;
   wherein in response to a charging control signal being authorized, the charging control signal is received from the cloud server at the first electric vehicle charging station using the local area network; and
   wherein the first electric vehicle charging station and the second electric vehicle charging station determine their charging transfers in relation to each other using received charging control signals via the local area network.

2. The system of claim 1, wherein the charging control signal is adjusted based on a communication with a grid utility.

3. The system of claim 1, wherein a user interface on the mobile device provides charging information related to one or more of: a charge transfer, including a length of a time period until a user's charge transfer is complete, whether any complications occurred in a charging process, and a current cost of a charging transaction.

4. A method for controlling a charging of multiple electric vehicles in a local area network of vehicle charging stations, the local area network including a first electric vehicle charging station and a second electric vehicle charging station, the method comprising:
   transmitting, from the first electric vehicle charging station, a charge transfer request for the electric vehicle to the cloud server via the mobile device, wherein a user of the mobile device is associated with the electric vehicle to be charged, wherein the first electric vehicle charging station is connected to an electric power grid using the local area network, and the electric power grid is further connected to a second electric vehicle charging station using the local area network;

in response to the charge transfer request being authorized, receiving a charging control signal from the cloud server at the first electric vehicle charging station using the local area network that enables a charge transfer from the first electric vehicle charging station to the electric vehicle; and determining charging transfers of the first electric vehicle charging station and the second electric vehicle charging station in relation to each other using received charging control signals via the local area network.

5. The method of claim 4, wherein the mobile device executes a mobile application for communicating with one or more of the cloud server, the charging station, and the electric vehicle.

6. The method of claim 4, wherein a message is sent from the first electric vehicle charging station to the cloud server.

7. The method of claim 4, wherein the charging control signal is adjusted based on a communication with a grid utility.

8. A system for controlling a charging of multiple electric vehicles in a local area network of vehicle charging stations, the local area network including a first electric vehicle charging station and a second electric vehicle charging station, the system comprising:

a memory device in a vehicle charging station of the local area network, the memory device storing instructions thereon that when executed by one or more processors, causes the one or more processors to:

send, from the first electric vehicle charging station, a charge transfer request for an electric vehicle at the first electric vehicle charging station to a cloud server via a mobile device, wherein a user of the mobile device is associated with the electric vehicle to be charged, wherein the first electric vehicle charging station is connected to an electric power grid using the local area network, and the electric power grid is further connected to the second electric vehicle charging station using the local area network;

in response to the charge transfer request being authorized, receive a charging control signal from the cloud server via the mobile device at the first electric vehicle charging station using the local area network that enables a charge transfer from the first electric vehicle charging station to the electric vehicle; and employ logic to optimize a local load using the charging control signal of the first electric vehicle charging station in the local area network and a charging control signal of the second electric vehicle charging station in the local area network.

9. The system of claim 8, wherein the mobile device is a cell phone.

10. The system of claim 8, wherein the mobile device is a component of an electric vehicle.

11. The system of claim 8, wherein the mobile device uses a telematics platform to communicate with the cloud server.

12. The system of claim 8, wherein the mobile device executes a mobile application for communicating with one or more of the cloud server, the charging station, and the electric vehicle.

13. The system of claim 8, wherein a message is sent from the first electric vehicle charging station to the cloud server.

14. The system of claim 8, wherein the charging control signal is adjusted based on a communication with a grid utility.

15. The system of claim 8, wherein a current for charging the electric vehicle is determined from the plurality of charging control signals from a plurality of electric vehicle charging stations.

16. The system of claim 8, wherein the system, which includes a cloud server, a mobile device, and charging stations, aggregates data from an in-vehicle telematics platform to forecast an energy load.

17. The system of claim 8, wherein the system includes a local area network of electric vehicle charging stations or other charging agents that use logic to communicate, self-regulate, and optimize the local load on a microgrid.

18. The system of claim 8, wherein the system includes electric vehicle charging stations in a local area network that adjust electrical loads to address a new electric vehicle connecting to and charging in the local area network.

19. The system of claim 8, wherein the system includes charging electric vehicle stations in the local area network that adjust electrical loads to take into account one fewer load on the local area network when an electric vehicle disconnects from the local area network.

20. The system of claim 8, wherein the system includes electric vehicle charging stations in the local area network that adjust electrical loads based on a forecasted demand of electricity use locally and at the grid level.

* * * * *